US011665735B2

(12) United States Patent
Nguyen et al.

(10) Patent No.: US 11,665,735 B2
(45) Date of Patent: May 30, 2023

(54) REQUEST AND RESPONSE TECHNIQUES FOR WIRELESS SYSTEMS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 16/409,720

(22) Filed: May 10, 2019

(65) Prior Publication Data

US 2019/0349959 A1  Nov. 14, 2019

Related U.S. Application Data

(60) Provisional application No. 62/671,402, filed on May 14, 2018.

(51) Int. Cl.
*H04W 72/12* (2023.01)
*H04W 72/566* (2023.01)
(Continued)

(52) U.S. Cl.
CPC .......... *H04W 72/569* (2023.01); *H04W 4/12* (2013.01); *H04W 4/40* (2018.02); *H04W 74/0816* (2013.01)

(58) Field of Classification Search
None
See application file for complete search history.

(56) References Cited

U.S. PATENT DOCUMENTS

| 2009/0122765 A1* | 5/2009 | Dimou | H04W 88/06 |
| | | | 370/336 |
| 2016/0381491 A1* | 12/2016 | Watfa | H04W 76/14 |
| | | | 455/41.2 |

(Continued)

FOREIGN PATENT DOCUMENTS

| EP | 3282794 A1 * | 2/2018 | .............. H04W 4/06 |
| WO | WO-2017030423 A1 | 2/2017 | |

OTHER PUBLICATIONS

Intel Corporation: "Short TTI Design Options for LTE V2V Sidelink Communication," 3GPP Draft; R1-1712487-INTEL-V2X_STTI_Schemes, 3rd Generation Partnership Project (3GPP), Mobile Competence Centre; 650, Route Des Lucioles ; F-06921 Sophia-Antipolis Cedex; France, vol. RAN WG1, No. Prague, Czech Republic; Aug. 21-Aug. 25, 2017, Aug. 20, 2017, XP051315303, 8 pages, Retrieved from the Internet: URL: http://www.3gpp.org/ftp/Meetings_3GPP_SYNC/RAN1/Docs/ [retrieved on Aug. 20, 2017] figures 1-5, sections 1-5.

(Continued)

*Primary Examiner* — Noel R Beharry
*Assistant Examiner* — Pamit Kaur
(74) *Attorney, Agent, or Firm* — Holland & Hart LLP

(57) ABSTRACT

Methods, systems, and devices for wireless communications are described. A transmitting user equipment (UE) such as a vehicle may identify data for transmission and transmit a request message to one or more receiving UEs (e.g., other vehicles). The request message may be associated with a first priority. The transmitting UE may monitor resources for a response message. The response message may be associated with a second priority. If the transmitting UE receives a response message, the transmitting UE may determine whether to transmit the data based on a comparison of the priorities of the request message and the response message. In some cases, the transmitting UE may transmit the data if (Continued)

the transmitting UE does not receive any response message. A receiving UE may receive the request message and determine whether to transmit a response message based on the priority and/or the receive power of the request message.

13 Claims, 18 Drawing Sheets

(51) Int. Cl.
*H04W 74/08* (2009.01)
*H04W 4/40* (2018.01)
*H04W 4/12* (2009.01)

(56) References Cited

U.S. PATENT DOCUMENTS

| | | |
|---|---|---|
| 2018/0049211 A1* | 2/2018 | Chang .................. H04W 16/14 |
| 2018/0124707 A1 | 5/2018 | Lee et al. |
| 2018/0255558 A1* | 9/2018 | Lee ....................... H04W 76/14 |
| 2019/0059019 A1* | 2/2019 | Wallentin .......... H04W 28/0268 |
| 2021/0136730 A1* | 5/2021 | Kim ..................... H04W 72/04 |

OTHER PUBLICATIONS

International Search Report and Written Opinion—PCT/US2019/032035—ISA/EPO—Jul. 12, 2019 (183182WO).

\* cited by examiner

REQUEST AND RESPONSE TECHNIQUES FOR WIRELESS SYSTEMS

CROSS REFERENCES

The present Application for Patent claims priority to U.S. Patent Application No. 62/671,402 by Nguyen et al., entitled "Request and Response Techniques for Wireless Systems," filed May 14, 2018, assigned to the assignee hereof, and expressly incorporated by reference herein.

BACKGROUND

The following relates generally to wireless communications, and more specifically to request and response techniques for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, such as in vehicle-to-everything (V2X) systems, vehicles (e.g., UEs) may communicate with each other (or with other types of UEs or internet of things (IoT) devices) by transmitting signals over a wireless link, and each vehicle may transmit information that may be relevant to multiple other vehicles or devices. In this instance, there may be multiple transmitters (e.g., transmitting vehicles) that exchange signals with multiple receivers (e.g., receiving vehicles). Thus, in some cases, vehicle-to-vehicle (V2V) transmissions are accomplished using multicasting, such that a single transmitting vehicle can transmit a signal to multiple receiving vehicles, and vice-versa. However, if multiple nearby transmitters simultaneously multicast transmissions to multiple receivers, the transmissions may interfere with each other. Techniques for mitigating interference in wireless communications, such as listen-before-talk (LBT) techniques or request-to-send/clear-to-send (RTS/CTS) techniques, may be ineffective in this scenario, which may lead to signal interference and degradation.

SUMMARY

The described techniques relate to improved methods, systems, devices, and apparatuses that support request and response techniques for wireless systems. Generally, the described techniques provide a request/response procedure for mitigating signal interference in a multi-transmitter, multi-receiver system, such as vehicle-to-everything (V2X) wireless communications system. In the response/request procedure, in order to transmit a set of data, a transmitter (e.g., a vehicle) may send a multicast request message (e.g., to one or more receiving devices such as another vehicle, a base station, an internet of things (IoT) device, etc.), which may include an indication of a priority of the request message. For example, in some cases, the transmitter may select a request identifier associated with a given priority. The request identifier may be included in the request message and used to indicate the given priority. In some examples, multiple request identifiers may be associated with the same priority, and a transmitter may select a request identifier of the multiple request identifiers that are associated with the given priority. In some cases, the identifier may be an alphanumeric value or another type of identifier value. In some cases, an identifier may be a sequence (e.g., a sequence of bits configured to indicate the given priority). For example, in some cases, the transmitter may select a request sequence from a set of ordered request sequences, each of which may be associated with a given priority. In some cases, the transmitter may transmit the request message as a modulated signal that indicates the given priority, and is thereby associated with the given priority, the request identifier, or both. If the transmitter receives a response message with the same or lower priority as the request message, the transmitter may begin transmitting (e.g., multicasting) the set of data. If the transmitter receives a response message with a higher priority than the request message, the transmitter may cede the channel and refrain from transmitting the set of data. If the transmitter does not receive any response message, the transmitter may determine whether the channel is available (e.g., by performing a listen-before-talk (LBT) procedure, a clear channel assessment (CCA) procedure, or another collision avoidance procedure), and begin transmitting the set of data if the channel is available.

From the receiving device perspective, a receiver may receive multiple request messages, each of which may be received from a different transmitter and may be associated with different priorities. The receiver may respond to a particular request message by transmitting (e.g., multicasting) a response message that includes an indication of the same priority as the request message to which it is responding (e.g., the highest priority request message). In some cases, the receiver may determine a receive power of a request message (e.g., a power at which the request message is received at the receiver), and may respond to a request message with a response message if the receive power is below a power threshold or may refrain from responding if the receive power is above the power threshold.

A method of wireless communications is described. The method may include identifying, by a device associated with a vehicle in a V2X communications system, a set of data for transmission via a shared radio frequency spectrum band, transmitting a request message to utilize a channel of the shared radio frequency spectrum band for transmission of the set of data, where the request message includes an indication of a first priority (e.g., an identifier or sequence), monitoring a set of time-frequency resources of the shared radio frequency spectrum band for a response message from a receiver in the V2X communications system, and determining whether to transmit the set of data to one or more wireless devices of the V2X communications system based on the monitoring.

An apparatus for wireless communications is described. The apparatus may include a processor, memory in electronic communication with the processor, and instructions stored in the memory. The instructions may be executable by the processor to cause the apparatus to identify, by a device associated with a vehicle in a V2X communications system, a set of data for transmission via a shared radio frequency spectrum band, transmit a request message to utilize a channel of the shared radio frequency spectrum band for transmission of the set of data, where the request message includes an indication of a first priority (e.g., an identifier or sequence), monitor a set of time-frequency resources of the shared radio frequency spectrum band for a response message from a receiver in the V2X communications system, and determine whether to transmit the set of data to one or more wireless devices of the V2X communications system based on the monitoring.

Another apparatus for wireless communications is described. The apparatus may include means for identifying, by a device associated with a vehicle in a V2X communications system, a set of data for transmission via a shared radio frequency spectrum band, transmitting a request message to utilize a channel of the shared radio frequency spectrum band for transmission of the set of data, where the request message includes an indication of a first priority (e.g., an identifier or sequence), monitoring a set of time-frequency resources of the shared radio frequency spectrum band for a response message from a receiver in the V2X communications system, and determining whether to transmit the set of data to one or more wireless devices of the V2X communications system based on the monitoring.

A non-transitory computer-readable medium storing code for wireless communications is described. The code may include instructions executable by a processor to identify, by a device associated with a vehicle in a V2X communications system, a set of data for transmission via a shared radio frequency spectrum band, transmit a request message to utilize a channel of the shared radio frequency spectrum band for transmission of the set of data, where the request message includes an indication of a first priority (e.g., an identifier or sequence), monitor a set of time-frequency resources of the shared radio frequency spectrum band for a response message from a receiver in the V2X communications system, and determine whether to transmit the set of data to one or more wireless devices of the V2X communications system based on the monitoring.

In some examples of the method, apparatuses, and non-transitory computer-readable medium described herein, monitoring the set of time-frequency resources may include operations, features, means, or instructions for receiving the response message from the receiver, where the response message includes an indication of a second priority (e.g., an identifier or sequence) that may be higher than the first priority and refraining from transmitting the set of data based on the second priority being higher than the first priority.

In some examples of the method, apparatuses, and non-transitory computer-readable medium described herein, monitoring the set of time-frequency resources may include operations, features, means, or instructions for receiving the response message from the receiver, where the response message includes an indication of a second priority (e.g., an identifier or sequence) that may be less than or equal to the first priority and transmitting the set of data based on the second priority being less than or equal to the first priority.

In some examples of the method, apparatuses, and non-transitory computer-readable medium described herein, monitoring the set of time-frequency resources may include operations, features, means, or instructions for determining whether the response message from the receiver may have been successfully received and transmitting the set of data based on determining that the response message may have not been received.

Some examples of the method, apparatuses, and non-transitory computer-readable medium described herein may further include operations, features, means, or instructions for selecting a request identifier associated with the first priority; and transmitting the request message comprising the request identifier.

In some examples of the method, apparatuses, and non-transitory computer-readable medium described herein, the request identifier is a sequence that is randomly selected from a set of ordered sequences.

Some examples of the method, apparatuses, and non-transitory computer-readable medium described herein may further include operations, features, means, or instructions for selecting a request identifier associated with the first priority, wherein the request message comprises a first modulated signal associated with the first priority and with the request identifier.

In some examples of the method, apparatuses, and non-transitory computer-readable medium described herein, the response message comprises a response identifier associated with a second priority or a second modulated signal associated with the second priority and with the response identifier.

In some examples of the method, apparatuses, and non-transitory computer-readable medium described herein, transmitting the request message may include operations, features, means, or instructions for transmitting the request message in a first symbol of a transmission time interval (TTI).

In some examples of the method, apparatuses, and non-transitory computer-readable medium described herein, monitoring the set of time-frequency resources may include operations, features, means, or instructions for receiving the response message in a second symbol of the TTI.

Some examples of the method, apparatuses, and non-transitory computer-readable medium described herein may further include operations, features, means, or instructions for transmitting at least a portion of the set of data in a third symbol of the TTI following the first and second symbols.

In some examples of the method, apparatuses, and non-transitory computer-readable medium described herein, the first symbol may be an initial symbol of the TTI.

In some examples of the method, apparatuses, and non-transitory computer-readable medium described herein, the first symbol and second symbol may be separated by a gap.

Some examples of the method, apparatuses, and non-transitory computer-readable medium described herein may further include operations, features, means, or instructions for performing an LBT procedure on the channel of the shared radio frequency spectrum band, where determining whether to transmit the set of data may be based on the LBT procedure.

In some examples of the method, apparatuses, and non-transitory computer-readable medium described herein, the request message may be a multicast transmission transmitted to a set of receivers in the V2X communications system.

A method of wireless communications is described. The method may include receiving, from a first device in a V2X communications system, a first request message to utilize a channel of a shared radio frequency spectrum band, where the first request message includes an indication of a first priority (e.g., an identifier or sequence), receiving, from a second device in the V2X communications system, a second request message to utilize the channel of the shared radio frequency spectrum band, where the second request message includes an indication of a second priority, determining a receive power for each of the first request message and the second request message, and determining whether to transmit a response message based on the first priority, the second priority, and the receive power for each of the first request message and the second request message.

An apparatus for wireless communications is described. The apparatus may include a processor, memory in electronic communication with the processor, and instructions stored in the memory. The instructions may be executable by the processor to cause the apparatus to receive, from a first device in a V2X communications system, a first request message to utilize a channel of a shared radio frequency spectrum band, where the first request message includes an indication of a first priority (e.g., an identifier or sequence), receive, from a second device in the V2X communications system, a second request message to utilize the channel of the shared radio frequency spectrum band, where the second request message includes an indication of a second priority (e.g., an identifier or sequence), determine a receive power for each of the first request message and the second request message, and determine whether to transmit a response message based on the first priority, the second priority, and the receive power for each of the first request message and the second request message.

Another apparatus for wireless communications is described. The apparatus may include means for receiving, from a first device in a V2X communications system, a first request message to utilize a channel of a shared radio frequency spectrum band, where the first request message includes an indication of a first priority (e.g., an identifier or sequence), receiving, from a second device in the V2X communications system, a second request message to utilize the channel of the shared radio frequency spectrum band, where the second request message includes an indication of a second priority (e.g., an identifier or sequence), determining a receive power for each of the first request message and the second request message, and determining whether to transmit a response message based on the first priority, the second priority, and the receive power for each of the first request message and the second request message.

A non-transitory computer-readable medium storing code for wireless communications is described. The code may include instructions executable by a processor to receive, from a first device in a V2X communications system, a first request message to utilize a channel of a shared radio frequency spectrum band, where the first request message includes an indication of a first priority (e.g., an identifier or sequence), receive, from a second device in the V2X communications system, a second request message to utilize the channel of the shared radio frequency spectrum band, where the second request message includes an indication of a second priority (e.g., an identifier or sequence), determine a receive power for each of the first request message and the second request message, and determine whether to transmit a response message based on the first priority, the second priority, and the receive power for each of the first request message and the second request message.

Some examples of the method, apparatuses, and non-transitory computer-readable medium described herein may further include operations, features, means, or instructions for determining that the first priority may be equal to or higher than the second priority and that the receive power for the first request message may be above a power threshold and refraining from transmitting the response message.

Some examples of the method, apparatuses, and non-transitory computer-readable medium described herein may further include operations, features, means, or instructions for receiving, from the first device, a set of data via the channel of the shared radio frequency spectrum band.

Some examples of the method, apparatuses, and non-transitory computer-readable medium described herein may further include operations, features, means, or instructions for determining that the first priority may be equal to or higher than the second priority and that the receive power for the first request message may be below a power threshold and transmitting the response message to at least the first device, where the response message corresponds to the first request message.

Some examples of the method, apparatuses, and non-transitory computer-readable medium described herein may further include operations, features, means, or instructions for receiving, from the first device, a set of data via the channel of the shared radio frequency spectrum band.

Some examples of the method, apparatuses, and non-transitory computer-readable medium described herein may further include operations, features, means, or instructions for determining that the first priority may be less than the second priority and that the receive power for the second request message may be below a power threshold and transmitting the response message to at least the second device, where the response message corresponds to the second request message.

Some examples of the method, apparatuses, and non-transitory computer-readable medium described herein may further include operations, features, means, or instructions for receiving, from the second device, a set of data via the channel of the shared radio frequency spectrum band.

Some examples of the method, apparatuses, and non-transitory computer-readable medium described herein may further include operations, features, means, or instructions for determining that the receive power for the first request message and the receive power for the second request message may be above a power threshold and refraining from transmitting the response message.

Some examples of the method, apparatuses, and non-transitory computer-readable medium described herein may further include operations, features, means, or instructions for receiving the first request message in a first symbol of a TTI and transmitting the response message in a second symbol of the TTI.

In some examples of the method, apparatuses, and non-transitory computer-readable medium described herein, the first and second symbols may be separated by a gap.

In some examples of the method, apparatuses, and non-transitory computer-readable medium described herein, the first symbol may be an initial symbol in the TTI.

DETAILED DESCRIPTION

Figure 1:
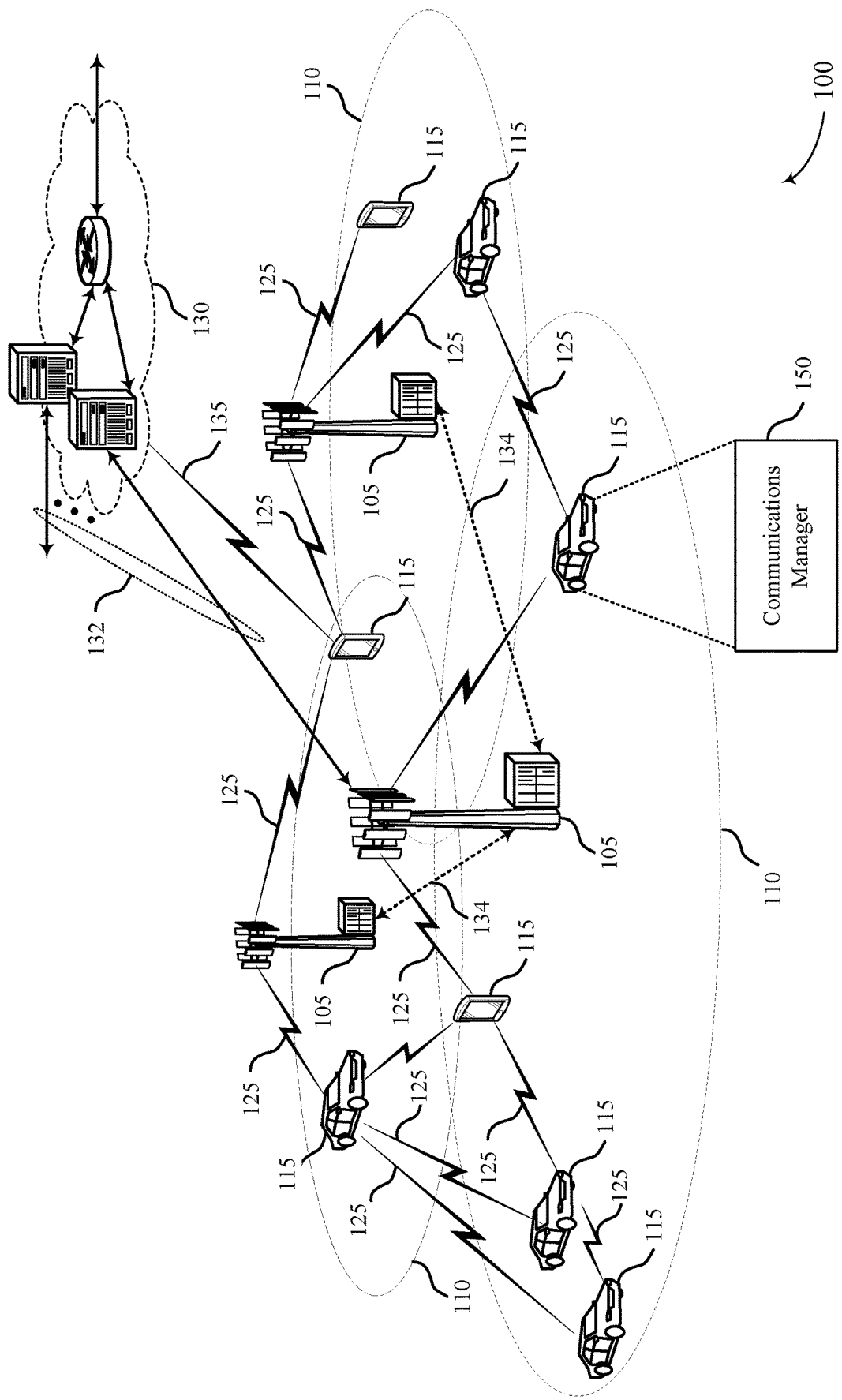
FIG. 1 illustrates an example of a wireless communications system that supports request and response techniques for wireless systems in accordance with aspects of the present disclosure.

In a wireless communication system, two or more user equipment (UEs) may be configured for wireless communications over a carrier (e.g., a channel, a sub-band, a bandwidth part) of a shared radio frequency spectrum band. In some wireless communications systems, such as vehicle-to-everything (V2X) systems, multiple devices within the system may perform multicast transmissions that interfere with each other. For example, each of the multiple transmitters (e.g., UEs such as vehicles) may perform multicast transmissions to nearby receivers (e.g., other vehicles, parking meters, traffic lights). If these transmissions are performed simultaneously or using overlapping time-frequency resources, the transmissions may experience interference at the devices(s) receiving the transmissions.

Traditionally, the problem of transmission interference in a multi-transmitter system has been addressed using contention-based access procedures such as listen-before-talk (LBT) or request to send (RTS)/clear to send (CTS). In LBT, a transmitter monitors a channel and waits to transmit until the channel is available. This approach may be effective when transmitters are close together and may detect signals from one another, but may not be as effective when transmitters are too far apart to detect each other's transmissions and thus begin transmitting simultaneously. This scenario may be referred to as a "hidden node" problem.

Some implementations of the RTS/CTS protocol may help to resolve the above-described hidden node problem. In RTS/CTS, a transmitter may send an RTS signal to a receiver, and if the receiver determines that a channel is available, the receiver may respond by sending a CTS signal to the transmitter. The transmitter may receive the CTS and begin transmitting to the receiver on the channel. In this case, the receiver may arbitrate the use of the transmission channel, thereby helping to resolve the hidden node problem.

In some cases, a transmitter may perform multicast transmissions by transmitting the same signal to multiple receivers, such as receivers that belong to the same multicast group as the transmitter or are within range of the transmitter. When multiple transmitters multicast signals to multiple receivers, neither LBT nor RTS/CTS may be sufficient.

As an example, if a single transmitter multicasts an RTS signal to two receivers, the first receiver may respond with a CTS but the second receiver may determine that the channel is not available (e.g., it may detect a hidden node) and may not respond with a CTS. In this case, the second receiver may not receive the transmission at all, or may receive a corrupted version of the transmission if there is interference from another transmission. Furthermore, if a single receiver receives RTS's from two transmitters, the receiver may not have a mechanism for choosing a transmitter to which to transmit a CTS.

Addressing potential signal interference becomes more complex when multiple transmitters are multicasting RTSs to multiple receivers. For example, if two receivers (receiver 1 and receiver 2) receive two RTSs from two transmitters (transmitter 1 and transmitter 2), each receiver may respond with a CTS to a different transmitter. That is, receiver 1 may respond with a CTS to transmitter 1, and receiver 2 may respond with a CTS to transmitter 2. In this case, both transmitter 1 and transmitter 2 receive CTSs and begin multicast transmission to both receiver 1 and receiver 2, which may cause interference at one or both of the receivers. In this case, both transmissions may be corrupted, and neither receiver may receive either transmission successfully.

According to aspects of the present disclosure, a UE operating as a transmitter or receiver may be configured to perform a request/response procedure to mitigate signal interference in a multicasting multi-transmitter, multi-receiver system, such as in a V2X system. In the response/request procedure, when a transmitter has identified a set of data for transmission, the transmitter may multicast a request message to one or more receivers. The request message may include an indication of a priority. The transmitter may then monitor time-frequency resources to determine whether it has received a response message from any of the receivers. If the transmitter receives a response message with the same or lower priority as the request message, the transmitter may begin transmitting (e.g., multicasting) the set of data. If the transmitter receives a response message with a higher priority than the request message, the transmitter may cede the channel and refrain from transmitting the set of data. If the transmitter does not receive any response message, the transmitter may determine whether the channel is available (e.g., by performing an LBT procedure, a CCA procedure, or another collision avoidance procedure), and begin transmitting the set of data if the channel is available.

A receiver may receive multiple request messages, each of which may be received from a different transmitter. Each request message may include an indication of a priority. The receiver may identify a particular request message to which it will respond, and may not respond to any of the other request messages. The receiver may identify the particular request by identifying the request message that has the highest priority relative to the priorities of the other request messages received by the receiver. The receiver may respond to the particular request message by multicasting a response message that includes an indication of the same priority as the request message. In some cases, the receiver may determine a receive power of a request message (e.g., a power at which the request message is received at the receiver), and may respond to a request message with a response message if the receive power is below a power threshold. In some cases, the receiver may not respond to a request message if the receive power is above the power threshold.

Based on the above-described request/response procedure, the transmitter with the highest-priority request message may begin transmission. In this manner, the request/response procedure provides a mechanism by which a receiver determines to which of multiple requests to respond, while also reducing the likelihood of granting a channel to multiple transmitters.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to request and response techniques for wireless systems.

FIG. 1 illustrates an example of a wireless communications system 100 in accordance with one or more aspects of the present disclosure. The wireless communications system 100 includes base stations 105 (e.g., next generation NodeBs (gNBs), and/or radio heads (RHs)), UEs 115, and a core network 130. In some examples, the wireless communications system 100 may be a licensed system such as a Long Term Evolution (LTE) system, an LTE-Advanced (LTE-A) system, or a New Radio (NR) system. In some aspects, the wireless communications system 100 may be an unlicensed or shared system. Wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135.

Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, a vehicle, or the like.

In some cases, a UE 115 may also be able to communicate directly with other UEs 115 (e.g., using a peer-to-peer (P2P), device-to device (D2D), or V2X protocol). One or more of a group of UEs 115 utilizing V2X communications may be within the coverage area 110 of a cell. Other UEs 115 in such a group may be outside the coverage area 110 of a cell, or otherwise unable to receive transmissions from a base station 105. In some cases, groups of UEs 115 communicating via V2X communications may utilize a one-to-many (1:M) system in which each UE 115 transmits (e.g., multicasts) to every other UE 115 in the group. In some cases, each UE 115 in a group explicitly joins the group or is automatically added to the group prior to initiating transmitting or receiving communications from other UEs 115 in the group. In some cases, UEs 115 may be added to a group based on proximity, for example.

In some cases, a base station 105 facilitates the scheduling of resources for V2X communications. In other cases, V2X communications are carried out independent of a base station 105.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the base stations 105 (e.g., eNBs, gNBs) may include subcomponents such as an access network entity, which may be an example of an access node controller (ANC). Each access network entity may communicate with a number of UEs 115 through a number of other access network transmission entities, each of which may be an example of a smart RH, or a transmission/reception point (TRP). In some configurations, various functions of each access network entity or base station 105 may be distributed across various network devices (e.g., RHs and ANCs) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical layer, transport channels may be mapped to physical channels.

A shared radio frequency spectrum band may be utilized in unlicensed network or a shared spectrum system. For example, an NR shared spectrum may utilize any combination of licensed, shared, and unlicensed spectrums, among others. The flexibility of enhanced component carrier (eCC) symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may perform LBT procedures to ensure the channel is clear before transmitting data. In some cases, operations in unlicensed bands may be based on a carrier aggregation configuration in conjunction with component carriers operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may support V2X communications in an unlicensed (e.g., shared) radio frequency spectrum band. For example, a UE 115 (e.g., a vehicle) may communicate with one or more neighboring UEs 115 via a direct wireless link (e.g., a PC5 interface link) over one or more carriers (e.g., channels, bandwidth parts) within the shared frequency bandwidth. The UE 115 may perform V2X communications in a manner which is consistent with V2X communication protocols and which complies with regulatory standards (i.e., medium access standards) for communicating over the shared frequency bandwidth.

UEs 115 may include a communications manager 150, which may be responsible for sending or receiving request messages or response messages, depending on whether UE 115 is currently operating as a transmitter or a receiver.

If UE 115 is operating as a transmitter, the communications manager 150 may identify a set of data for transmission and multicast a request message to request resources for the transmission. In some cases, the set of data is to be transmitted (e.g., multicasted) over a shared radio frequency spectrum band from a first vehicle to one or more other vehicles. In some cases, the communications manager 150 may select an identifier to be included in the request message. The identifier may be associated with a priority. In some cases, multiple identifiers may be associated with the same priority, or each identifier may be associated with a different priority. In some cases, the identifier may be a sequence. For example, in some cases, the communications manager 150 may select a sequence from an ordered set of sequences to be included in the request message. Each sequence may be associated with a priority. Thus, the selected sequence may be used as an indication of the priority of the request message. However, other indications of priority may be used instead of or in addition to an identifier or a sequence. For example, in some cases, the priority may be indicated by a modulated signal, and the request message may include the modulated signal or a sequence or identifier having the same or different priority as the modulated signal.

In some cases, the communications manager 150 may then monitor resources to determine whether the UE 115 has received a response message, and determine whether to transmit the set of data based on whether the UE 115 has received a response message.

A receiving device may be a UE 115 or a base station 105. For example, if the UE 115 is operating as a receiver, the communications manager 150 may receive one or more request messages (e.g., from one or more other UEs 115) requesting resources for transmission. Each request message may include an indication of a priority. The communications manager may select a request message of the received request messages based on the relative priorities of the request messages. The UE 115 may transmit a response message corresponding to the selected request message. In some cases, the response message may include an indication of the same priority as the selected request message. In some cases, before transmitting a response message corresponding to a request message, communications manager 150 may determine whether the request message is associated with a power that is below a power threshold, and may only transmit the response message if the power is below the threshold. In some cases, the response message may include a modulated signal.

Figure 2:
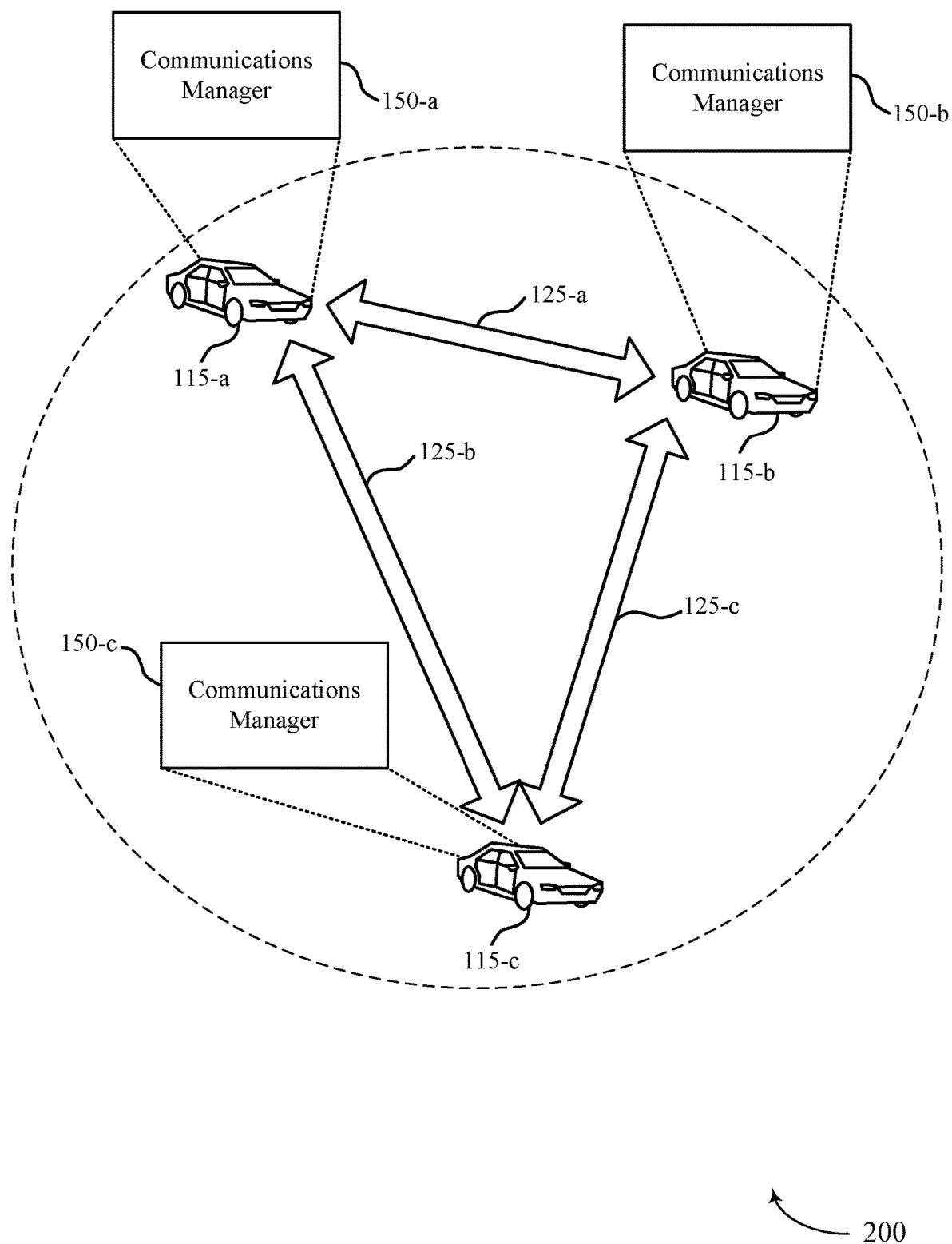
FIG. 2 illustrates an example of a wireless communications system that supports request and response techniques for wireless systems in accordance with aspects of the present disclosure.

FIG. 2 illustrates an example of a wireless communications system 200 that supports request and response mechanisms for wireless systems in accordance with one or more aspects of the present disclosure. In some examples, wireless communications system 200 may implement aspects of wireless communications system 100.

Wireless communication system 200 includes multiple vehicles (e.g., UEs) 115 that may communicate with each other via communication links 125. Each vehicle 115 may include communications manager 150, such as communications manager 150 described with respect to FIG. 1. Vehicles 115 may transmit request messages via communication links 125, and in some cases, vehicles 115 (or another device such as a base station or IoT device) may transmit response messages via communication links 125. In some cases, vehicles 115 may monitor communication links 125 for transmitted request messages or response messages. In some cases, vehicle 115-a, 115-b, and 115-c are members of a multicast group, and may be configured to multicast request messages, response messages, data, or other communications to each other.

In some cases, a vehicle 115 (e.g., vehicle 115-a) may identify a set of data for transmission. Vehicle 115-a may transmit (e.g., multicast) a request message to vehicle 115-b and vehicle 115-c via communication links 125-a and 125-c to request a channel for transmission of the set of data. In some cases, the request message includes an indication of a first priority (e.g., an identifier or sequence).

In some examples, vehicle 115-*a* may select an identifier associated with the first priority, and may include the selected identifier in the request message. In some cases, multiple identifiers may be associated with a single priority (e.g., with the first priority), and vehicle 115-*a* may select one of the multiple identifiers associated with the first priority. In some cases, the identifier may be a sequence. For example, vehicle 115-*a* may select a sequence from an ordered set of sequences. The selected sequence may be included in the request message, and may be associated with the first priority. In some cases, the selected sequence may be used as the indication of the first priority. In some cases, the ordered set of sequences includes 6, 7, 8, 9, or 10 sequences, each of which is associated with a corresponding priority. In some cases, the vehicle 115-*a* may select the sequence by randomly selecting the sequence from the set of sequences. In some cases, vehicle 115-*a* may be configured to select a particular sequence from the set of sequences, or may select a sequence based on a rule.

In some cases, the sequence may be a type of sequence that minimizes correlation or transmission interference between different sequences in the set of sequences, such that a receiver may be able to detect multiple sequences at a time (e.g., if the receiver receives multiple request messages). In some cases, the sequence may be a type of sequence that may be transmitted with relatively high power without introducing nonlinearities into the signal. In some cases, the sequence may be a Zadoff-Chu sequence, or an m-sequence, or another type of sequence with appropriate correlation and/or transmission linearity properties. In some cases, the sequence may be a type of sequence that may also be used to transmit a synchronization signal, such as a primary synchronization signal (PSS) or a secondary synchronization signal (SSS).

In some cases, the request message may include a modulated signal that indicates the first priority (e.g., in addition to or instead of including a sequence or identifier).

After transmitting the request message, vehicle 115-*a* may monitor a set of time-frequency resources via communication links 125-*a* and 125-*b* for a response message from vehicle 115-*b* or vehicle 115-*c*. The response message may include an indication of a second priority (e.g., an identifier or sequence). In some cases, vehicle 115-*a* may determine whether to transmit the set of data based on whether vehicle 115-*a* received a response message from vehicle 115-*b* or vehicle 115-*c*. In some cases, the response message may include an identifier or sequence indicating the second priority and/or a modulated signal indicating the second priority, which may be the same or different from the first priority.

In some cases, if vehicle 115-*a* receives a response message, vehicle 115-*a* may compare the first priority (e.g., the priority indicated by the request message) with the second priority (e.g., the priority indicated by the response message) to determine whether the second priority is higher than, less than, or equal to the first priority. In some cases, if the second priority is less than or equal to the first priority, vehicle 115-*a* may transmit the set of data. In some cases, if the second priority is higher than the first priority, vehicle 115-*a* may refrain from transmitting the set of data; e.g., vehicle 115-*a* may cede the channel. In some cases, if vehicle 115-*a* cedes the channel, vehicle 115-*a* may, after a period of time, transmit another request message to re-attempt transmission of the set of data.

In some cases, if vehicle 115-*a* does not receive a response message, vehicle 115-*a* may still transmit the set of data. For example, if vehicle 115-*a* does not receive a response message, vehicle 115-*a* may perform an LBT procedure on the channel, and if the LBT procedure determines that the channel is available, vehicle 115-*a* may transmit the set of data. If the LBT procedure determines that the channel is not available, vehicle 115-*a* may refrain from transmitting the set of data.

In some instance, when vehicle 115-*a* identifies a set of data for transmission, communications manager 150 selects an identifier, such as by selecting an identifier of one or more identifiers associated with a priority or by selecting a sequence from a set of ordered sequences. Each of the sequences in the ordered set of sequences may be associated with a priority, which may be based on the order. The request message may include the selected identifier or sequence, which may be associated with the first priority. In some cases, the request message may include a modulated signal associated with the first priority and with the identifier.

In some cases, a vehicle 115 (e.g., vehicle 115-*b*) may receive one or more request messages from other vehicle (e.g., vehicle 115-*a* and vehicle 115-*c*). Each request message may include an indication of a priority. If vehicle 115-*b* has received multiple request messages, vehicle 115-*b* may select one of the request messages based on its priority. For example, vehicle 115-*b* may compare the priorities of the received request messages, and select the request message with the highest priority.

Based on the priority comparison, vehicle 115-*b* may then transmit (e.g., multicast) a response message to, e.g., vehicle 115-*a* and vehicle 115-*c*. The response message may include an indication of the same priority as the priority of the selected request message. In some cases, if the indication of the priority of the request message is an identifier or sequence (such as described above), the response message may include the same identifier or sequence. Thus, the indication of the priority of the response message may be an identifier or sequence. In some cases, if the indication of the priority of the request message is a modulated signal, the response message may include the same modulated signal. Thus, the indication of the priority of the response message may be a modulated signal.

In some cases, vehicle 115-*b* may refrain from sending any other response messages corresponding to any of the other received request messages. A benefit of this approach may be that vehicle 115-*b* may not send a response signal to the other transmitters, thereby reducing the amount of signaling during channel contention.

In some cases, it may increase overhead for a receiver to frequently respond to request messages since each response message may involve the receiver interrupting other operations (such as receiving other signals). Thus, in some examples, vehicle 115-*b* may determine whether any of the received response messages are associated with a receive power that is below a power threshold. In some cases, vehicle 115-*a* may only transmit a response message corresponding to a request message if the request message has a receive power that is below the power threshold. For example, if vehicle 115-*a* is near vehicle 115-*b*, the receive power associated with a request message from vehicle 115-*a* may be greater than the power threshold. In this case, vehicle 115-*b* may not transmit a response message corresponding to the request message from vehicle 115-*a* even if the request message from vehicle 115-*a* has a higher priority than any other request messages received by vehicle 115-*b*. The assumption in this case may be that, for transmitters that are near to the receiver, the channel may already be protected via transmitter-side protection techniques (such as LBT), and therefore the receiver may not need to transmit a response. In some cases, UE 115-*b* may determine the receive power of a request message by determining or measuring the power in milliwatts, the power in decibel-milliwatts (dBm), and/or the received signal strength indicator (RSSI) associated with the request message.

In some cases, vehicle 115-*b* may select a request message (e.g., based on a priority of the request message) and then determine whether the selected request message is associated with a receive power that is below the power threshold in order to determine whether to transmit a response message corresponding to the selected request message. In other cases, vehicle 115-*a* may first determine whether any received request message is associated with a receive power that is below the power threshold, and if none of the request messages are associated with a power below the power threshold, vehicle 115-*a* may not select any request message or compare the priorities of any request messages; that is, vehicle 115-*a* may determine not to send a response message without determining which request message has the highest priority.

In some cases, a vehicle 115 (or other devices in the V2X system) may transmit request messages, receive response messages, and transmit data based on a format of a transmission time interval (TTI), such as TTI format 300 discussed with reference to FIG. 3.

Figure 3:
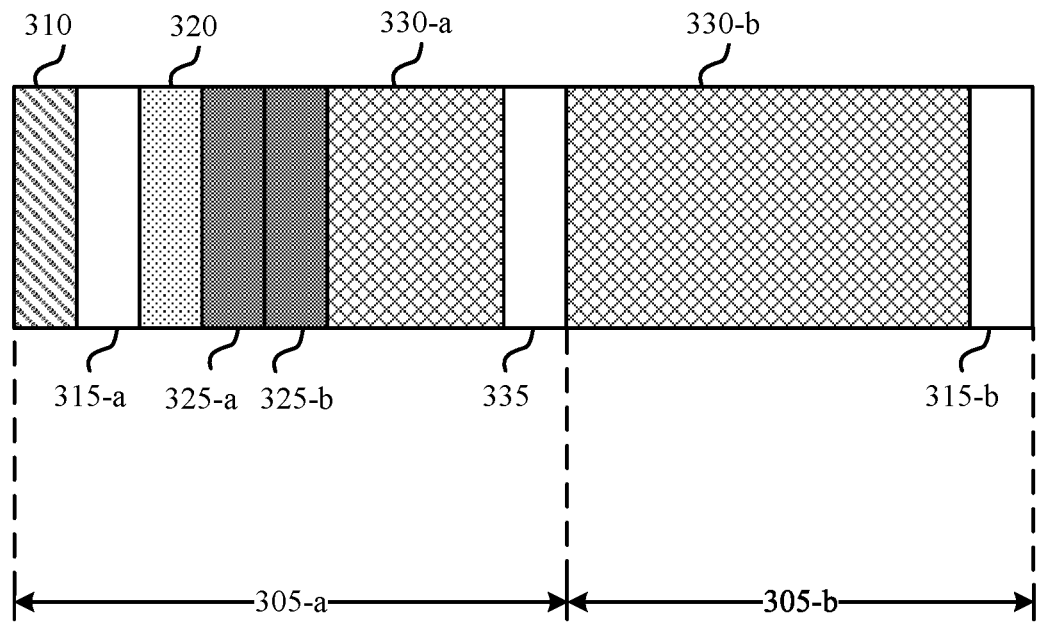
FIG. 3 illustrates an example of a transmission time interval (TTI) that supports request and response techniques for wireless systems in accordance with aspects of the present disclosure.

FIG. 3 depicts a TTI format 300 including a first TTI 305-*a* and a second TTI 305-*b* that supports request and response mechanisms for wireless systems in accordance with one or more aspects of the present disclosure. TTI format 300 may be implemented by aspects of wireless communications systems 100 or 200.

In some cases, UEs 115 may communicate with each other by transmitting subframes or packets during a TTI 305. The TTI 305 may have a duration of 0.5, 1, 2, 10, 20, 40, or 80 ms, for example, or may have another duration. During each TTI 305, one or more symbols (e.g., OFDM symbols) may be transmitted or received. The duration of the TTI 305 may be a multiple of the duration of a symbol. In some cases, the format for a TTI 305 is predetermined such that a transmitter or receiver transmits or receives specific types of information in certain symbols of the TTI 305.

In some cases, a request message may occupy a first symbol 310 of a first TTI 305-*a*. For example, the first symbol may be the initial symbol of the first TTI 305-*a*. A request message may be transmitted by a transmitting device such as a vehicle in the first symbol 310 and a request message may be received by receiving device such as a vehicle, base station, or other IoT device, in first symbol 310. The receiving device may monitor a set of time-frequency resources to determine whether a request message is received in first symbol 310.

In some cases, a response message may occupy a second symbol 320 of the first TTI 305-*a*. For example, a response message may be transmitted by the receiving device in second symbol 320 and the response message may be received by a device in second symbol 320. In some instances, a transmitting device may monitor a set of time-frequency resources to determine whether a response message is received in second symbol 320.

In some examples, the first symbol and the second symbol may be separated by a gap 315-*a*, which may have a duration of a single symbol or multiple symbols (e.g., the gap may 315-*a* have one-symbol duration or two-symbol duration). A TTI 305 may include one or more gaps 315 between symbols to provide the UE or vehicle with time to switch from a transmitting mode to a receiving mode, or from a receiving mode to a transmitting mode. During the gap 315-*a*, one or more devices (e.g., a transmitting device, a receiving device) do not transmit any symbols or monitor a channel to receive any symbols.

In some cases, if a vehicle transmits a request message in the first symbol 310 and receives a response message in the second symbol 320, and the response message has a priority that is lower than or equal to the priority of the request message, the vehicle may respond by transmitting control information in one or more subsequent symbols 325-*a*, 325-*b* of the first TTI and transmitting the set of data in one or more subsequent symbols 330-*a* (e.g., symbols that follow the control information) of the first TTI 305-*a*. The control data may include, for example, uplink control information (UCI), scheduling information (SR), channel quality reports, or other types of control information.

In some cases, if a vehicle transmits a request message in the first symbol 310 and receives a response message in the second symbol 320 having a priority that is higher than the priority of the request message, the vehicle may cede the channel and refrain from transmitting the control information and the set of data. In some cases, if the vehicle transmits a request message in the first symbol 310 and does not receive a response message in the second symbol 320, the vehicle may perform an LBT procedure to determine whether the channel is available, and may transmit the control information and the set of data if the channel is available.

In some cases, the first TTI 305-*a* may include a final symbol 335 after the data symbol(s) that may be used for transmitting or receiving feedback information such as an acknowledgement (ACK) or negative ACK (HACK) signal, or the final symbol 335 may be reserved for another purpose, or may be unused (e.g., symbol 335 may be a gap).

In some cases, the set of data may be too large for transmission within the first TTI 305-*a*. In such instances, the vehicle may transmit a first portion of the set of data in the first TTI 305-*a* and transmit a remaining portion of the set of data in one or more second TTIs 305-*b*. A second TTI 305-*b* may have the same or different duration as the first TTI 305-*a*. In some cases, the second TTI 305-*b* may not include symbols for one or more of the request message, the response message, and/or the control information. The second portion of the set of data may be transmitted in one or more symbols 330-*b*, which may include the initial symbol of the second TTI (e.g., in the first symbol) and, depending on the amount of data to be transmitted, in one or more additional symbols of the second TTI.

Figure 4:
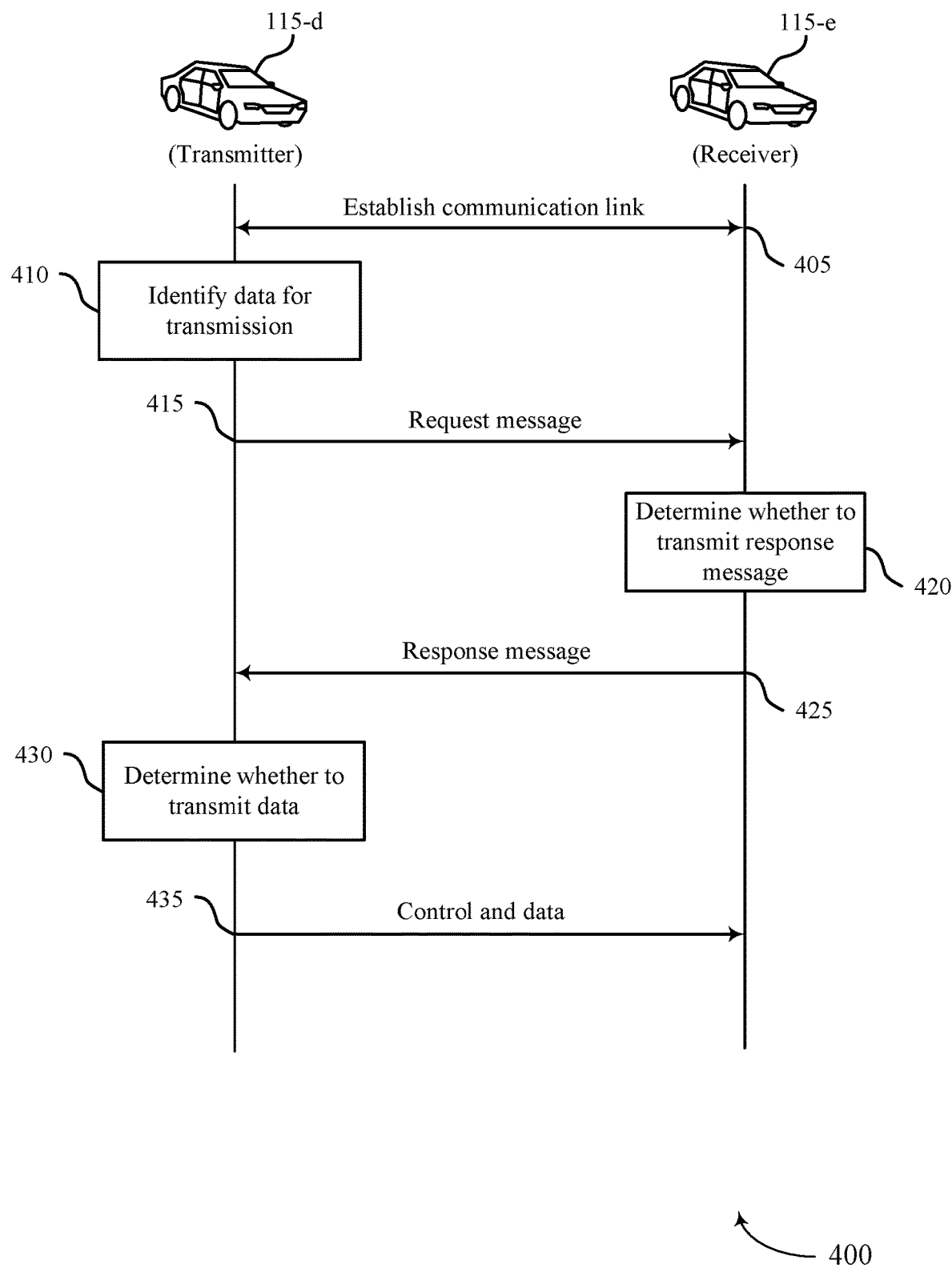
FIG. 4 illustrates an example of a process flow that supports request and response techniques for wireless systems in accordance with aspects of the present disclosure.

FIG. 4 shows an example of a process flow 400 that supports request and response mechanisms for wireless systems in accordance with aspects of the present disclosure.

In some cases, process flow 400 may be implemented by aspects of wireless communications systems 100 or 200 as described with reference to FIGS. 1 and 2. In some cases, process flow 400 may represent aspects of techniques performed by one or more vehicles such as UEs 115 or other IoT devices as described with reference to FIGS. 1, 2, and 3. Within process flow 400, UE 115-*d* may be operating as a transmitter, and UE 115-*e* may be operating as a receiver. In some examples, UE 115-*e* may be a different type device in the V2X system such as a base station or an IoT device. While UE 115-*d* and UE 115-*e* are depicted as vehicles, either or both of UE 115-*d* and UE 115-*e* may be another type of UE, such as a traffic light, a cell phone, etc.

At 405, UE 115-*d* and UE 115-*e* may establish a communication link on a channel of a shared spectrum band. In some cases, establishing the communication link may include explicitly or automatically joining a multicasting group, such as by one or both of UE 115-*d* and UE 115-*e* moving within range of each other. In some cases, the communication link may be an example of communication links 125 depicted in FIGS. 1 and 2.

At 410, UE 115-*d* may identify a set of data for transmission. UE 115-*d* may identify the set of data by identifying that UE 115-*d* has received data in a buffer or that the UE 115-*d* has received a packet for transmission (e.g., from a higher layer), for example.

At 415, UE 115-*d* may transmit a request message to request utilization of a channel of the shared radio frequency spectrum band for transmission of the set of data. In some cases, UE 115-*d* may transmit the request message by multicasting the request message to one or more receivers, including UE 115-*e*. In some cases, the request message may include an indication of a first priority, such as a first identifier. In some cases, the indication of the first priority includes a first sequence selected from an ordered set of sequences. In some cases, the indication of the first priority may include a first modulated signal associated with the first priority and with the first identifier.

At 420, UE 115-*e* may determine whether to transmit a response message. UE 115-*d* may determine whether to transmit a response message by comparing the priority of the request message (e.g., the first priority) with the priorities of any other request messages received by UE 115-*e* (e.g., from other transmitters). In some cases, UE 115-*e* may transmit a response message if UE 115-*e* determines that the request message is associated with a higher priority than the priority associated with any other received request messages. In some examples, UE 115-*e* may determine whether to respond to the request message by determining whether the request message is associated with a receive power that is lower than a power threshold. In some aspects, UE 115-*e* may transmit a response message if the request message is associated with a receive power that is lower than the power threshold. In some instances, UE 115-*e* may determine whether to transmit a response message based on both of these (and possibly other) criteria, e.g., based on an evaluation of both the priority of the request message relative to the priorities of any other received request messages, and on an evaluation of the receive power associated with the request message relative to a power threshold. In some cases, if UE 115-*e* determines that the request message is associated with a receive power that is above the power threshold, UE 115-*e* may not transmit a response message corresponding to the request message, even if the request message from UE 115-*d* is associated with a higher priority than any other request message received by UE 115-*e*.

At 425, UE 115-*e* may transmit a response message; e.g., if UE 115-*e* has determined to transmit a response message at 420. In some cases, UE 115-*e* may transmit the response message by multicasting the response message to one or more transmitters, including UE 115-*d*. In some examples, the response message may include an indication of a second priority, such as an identifier or sequence indicating the second priority and/or a modulated signal indicating the second priority. In some aspects, if the response message corresponds to the request message received from UE 115-*d* (e.g., if UE 115-*e* determines that the request message from UE 115-*d* has the highest priority and/or is below the power threshold), the second priority may be the same as the first priority; that is, the response message may include an indication of the same priority as the request message. In some instances, if the response message corresponds to a different request message from a different UE (e.g., not UE 115-*d*), the second priority may be the same as the priority of the different request message. In this case, the second priority may be lower than or higher than the first priority; e.g., the priority indicated by the response message may be lower or higher than the priority indicated by the request message. In some cases, the indication of the second priority includes a second identifier associated with the second priority. In some cases, the second identifier may be a second sequence selected from the set of ordered sequences. In some examples, the response message may include the same identifier or sequence as the request message; e.g., the second identifier or sequence may be the same as the first identifier or sequence. In some cases, the indication of the second priority includes a second modulated signal associated with the second priority and with the second identifier. In some examples, the response message may include the same modulated signal as the request message (e.g., the second modulated signal may be the same as the first modulated signal).

At 430, UE 115-*d* may determine whether to transmit the set of data based at least in part on monitoring a set of time-frequency resources for a response message.

If UE 115-*d* has received a response message (e.g., from UE 115-*e* or from another UE), UE 115-*d* may determine whether to transmit the set of data by comparing the second priority (e.g., the priority of the response message) with the first priority (e.g., the priority of the request message sent by UE 115-*d* at 415). In some examples, UE 115-*d* may compare the first priority with the second priority by comparing the first identifier or sequence with the second identifier or sequence. In some examples, UE 115-*d* may compare the first priority with the second priority by comparing the first modulated signal with the second modulated signal.

In some cases, UE 115-*d* may transmit the set of data if UE 115-*e* determines that the response message indicates either the same priority or a lower priority than the first priority. In some cases, if UE 115-*d* determines that the response message indicates the same priority as the first priority (e.g., if the first (request) identifier is associated with the same priority as the second (response) identifier, such as may be the case if the first identifier and second identifier are the same or are different identifiers associated with the same priority), then the UE 115-*d* may compare the first identifier with the second identifier to determine whether to transmit the set of data. For example, UE 115-*d* may determine whether the first identifier is higher than, equal to, or lower than the second identifier to determine whether to transmit the set of data.

In some aspects, if UE 115-*d* determines that the second priority is higher than the first priority, UE 115-*d* may cede the channel and refrain from transmitting the set of data.

If UE 115-*d* does not receive a response message, UE 115-*d* may determine whether to transmit the set of data by determining whether the channel is available. UE 115-*d* may determine whether the channel is available by using an LBT or CCA protocol, for example, or by some other channel evaluation mechanism or protocol. In some instances, if UE 115-*d* determines that the channel is available, UE 115-*d* may determine that it will transmit the set of data. In some examples, if UE 115-*d* determines that the channel is not available, UE 115-*d* may determine that it will not transmit the set of data.

At 435, UE 115-*d* may transmit the set of data; e.g., if UE 115-*d* has determined to transmit the set of data at 430. In some cases, UE 115-*d* 115-*e* may transmit the set of data by multicasting the set of data to one or more receivers, including receiver 115-*e*. In some aspects, if UE 115-*d* transmits the set of data, UE 115-*d* may also transmit control information. Such control information may include, for example, uplink control information, channel state information, rank indication, or other types of control information.

Figure 5:
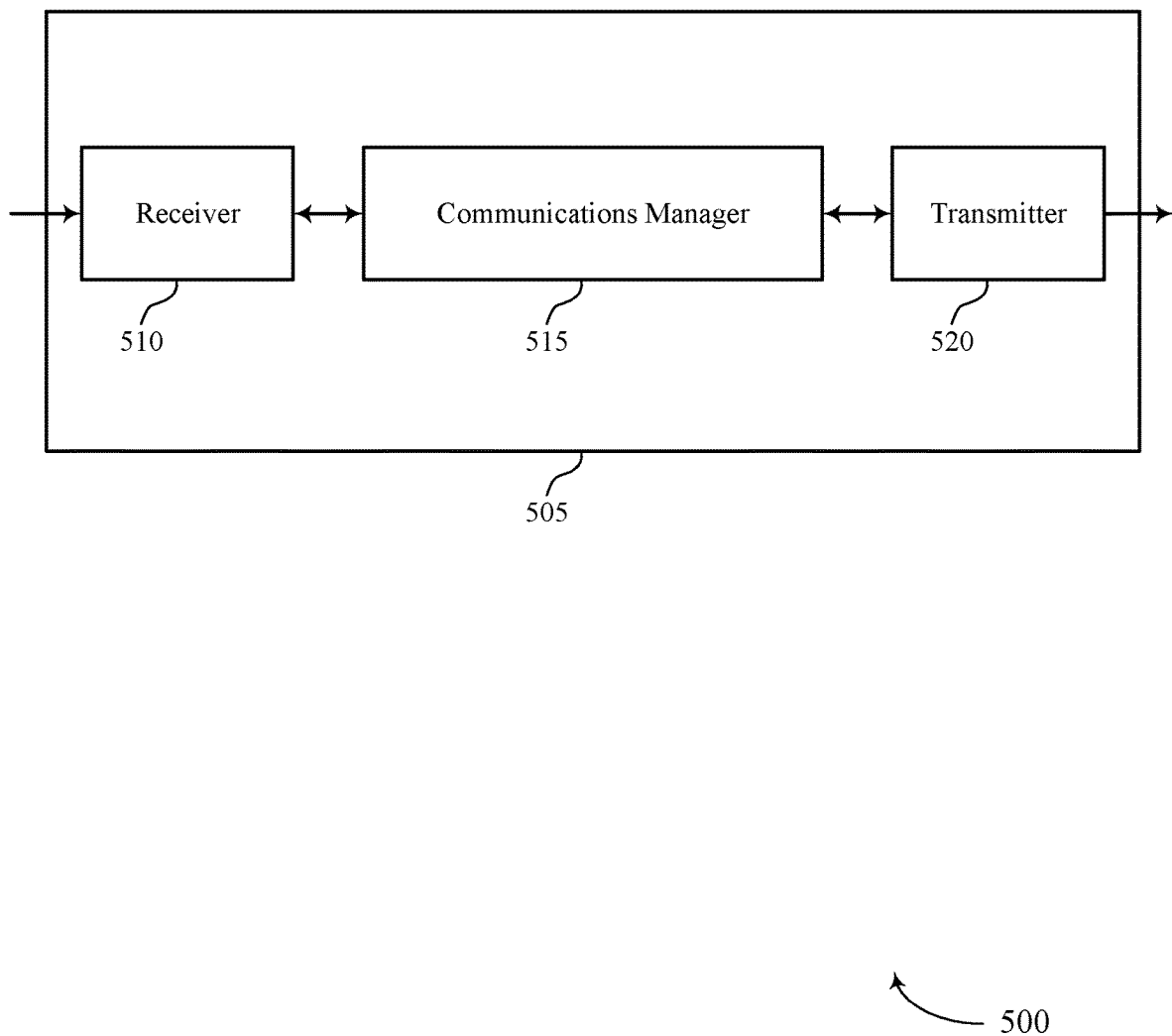
FIGS. 5 and 6 show block diagrams of devices that support request and response techniques for wireless systems in accordance with aspects of the present disclosure.

FIG. 5 shows a block diagram 500 of a device 505 that supports request and response techniques for wireless systems in accordance with aspects of the present disclosure. The device 505 may be an example of aspects of a base station 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to request and response techniques for wireless systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a first device in a V2X communications system, a first request message to utilize a channel of a shared radio frequency spectrum band, where the first request message includes an indication of a first priority (e.g., an identifier or sequence) and receive, from a second device in the V2X communications system, a second request message to utilize the channel of the shared radio frequency spectrum band, where the second request message includes an indication of a second priority (e.g., an identifier or sequence). The communications manager 515 may determine a receive power for each of the first request message and the second request message and determine whether to transmit a response message based on the first priority, the second priority, and the receive power for each of the first request message and the second request message. The communications manager 515 may be an example of aspects of the communications manager 150, 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
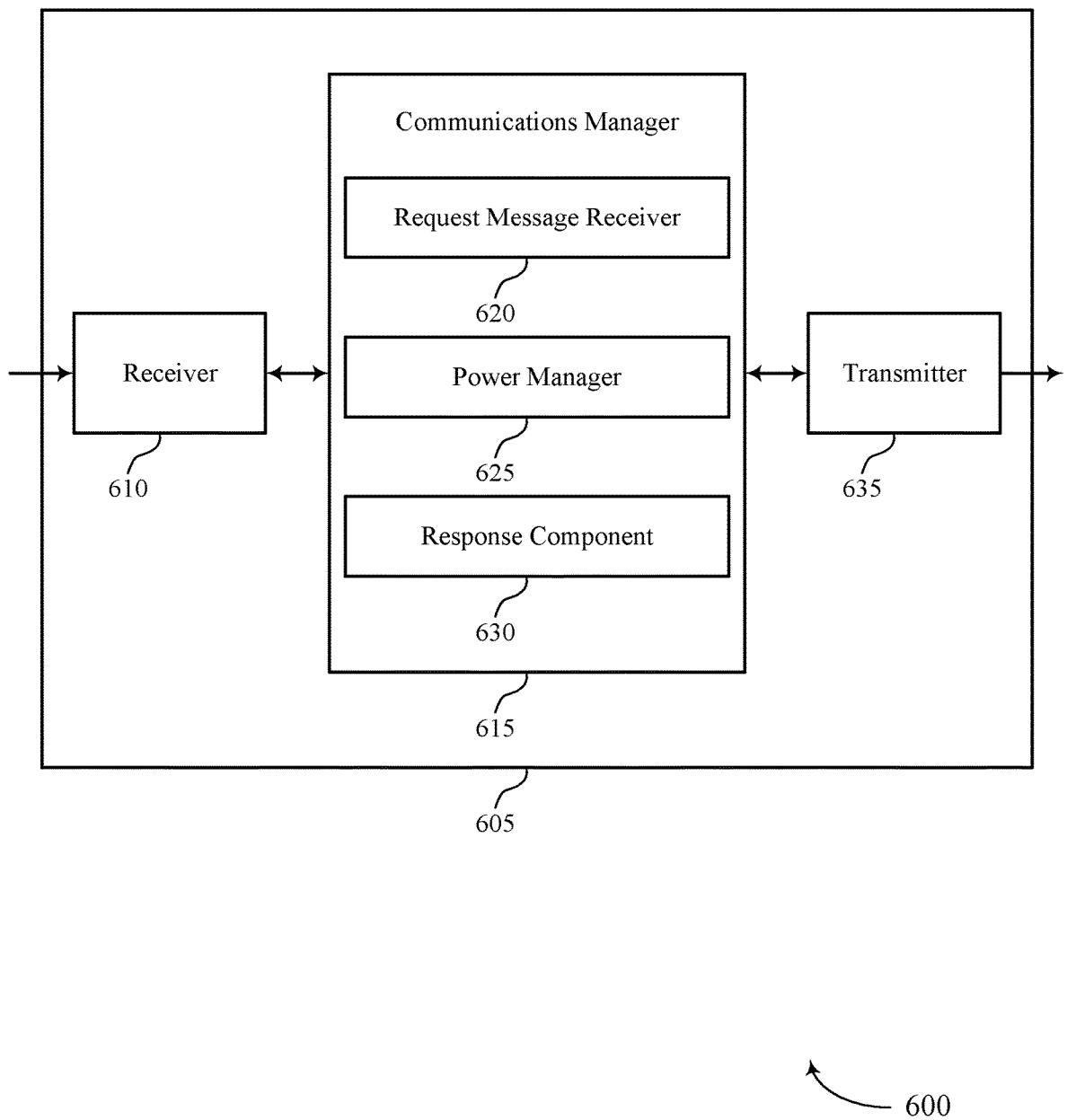

FIG. 6 shows a block diagram 600 of a device 605 that supports request and response techniques for wireless systems in accordance with aspects of the present disclosure. The device 605 may be an example of aspects of a device 505 or a base station 105 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to request and response techniques for wireless systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a request message receiver 620, a power manager 625, and a response component 630. The communications manager 615 may be an example of aspects of the communications manager 810 described herein.

The request message receiver 620 may receive, from a first device in a V2X communications system, a first request message to utilize a channel of a shared radio frequency spectrum band, where the first request message includes an indication of a first priority (e.g., an identifier or sequence). The request message receiver 620 may receive, from a second device in the V2X communications system, a second request message to utilize the channel of the shared radio frequency spectrum band, where the second request message includes an indication of a second priority (e.g., an identifier or sequence).

The power manager 625 may determine a receive power for each of the first request message and the second request message.

The response component 630 may determine whether to transmit a response message based on the first priority, the second priority, and the receive power for each of the first request message and the second request message.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
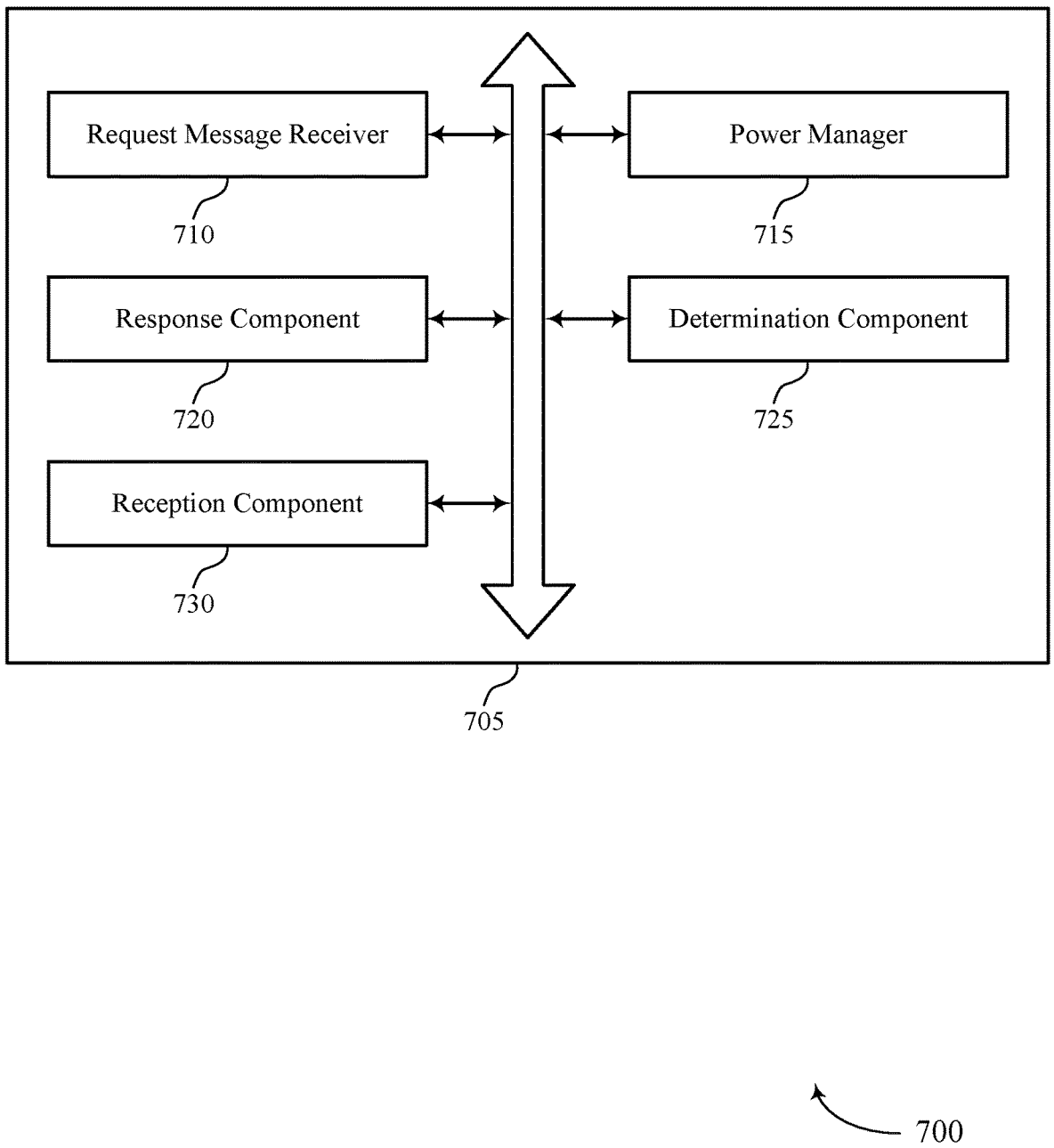
FIG. 7 shows a block diagram of a communications manager that supports request and response techniques for wireless systems in accordance with aspects of the present disclosure.

FIG. 7 shows a block diagram 700 of a communications manager 705 that supports request and response techniques for wireless systems in accordance with aspects of the present disclosure. The communications manager 705 may be an example of aspects of a communications manager 515, a communications manager 615, or a communications manager 810 described herein. The communications manager 705 may include a request message receiver 710, a power manager 715, a response component 720, a determination component 725, and a reception component 730. Each of these modules may communicate, directly or indirectly, with one another (e.g., via one or more buses).

The request message receiver 710 may receive, from a first device in a V2X communications system, a first request message to utilize a channel of a shared radio frequency spectrum band, where the first request message includes an indication of a first priority. In some examples, receiving, from a second device in the V2X communications system, a second request message to utilize the channel of the shared radio frequency spectrum band, where the second request message includes an indication of a second priority. In some examples, the indication of the first priority may include a first identifier or a first sequence associated with the first priority. In some cases, the indication of the second priority may include a second identifier or a second sequence associated with the second priority.

The power manager 715 may determine a receive power for each of the first request message and the second request message. In some examples, the power manager 715 may determine that the receive power for the first request message and the receive power for the second request message is above a power threshold.

The response component 720 may determine whether to transmit a response message based on the first priority, the second priority, and the receive power for each of the first request message and the second request message. In some examples, the response component 720 may determine whether to transmit a response message based on a comparison of the first identifier with the second identifier or a comparison of the first sequence with the second sequence. In some examples, the response component 720 may refrain from transmitting the response message. In some examples, the response component 720 may transmit the response message to at least the first device, where the response message corresponds to the first request message. In some examples, the response component 720 may transmit the response message to at least the second device, where the response message corresponds to the second request message. In some examples, the response component 720 may transmit the response message in a second symbol of the TTI. In some cases, the first and second symbols are separated by a gap.

The determination component 725 may determine that the first priority is equal to or higher than the second priority and that the receive power for the first request message is above a power threshold. In some examples, the determination component 725 may determine that the first priority is equal to or higher than the second priority and that the receive power for the first request message is below a power threshold. In some examples, the determination component 725 may determine that the first priority is less than the second priority and that the receive power for the second request message is below a power threshold. In some examples, the determination component 725 may determine that the first identifier is equal to, higher than, or lower than the second identifier.

The reception component 730 may receive, from the first device, a set of data via the channel of the shared radio frequency spectrum band. In some examples, the reception component 730 may receive, from the second device, a set of data via the channel of the shared radio frequency spectrum band. In some examples, the reception component 730 may receive the first request message in a first symbol of a TTI. In some cases, the first symbol is an initial symbol in the TTI.

Figure 8:
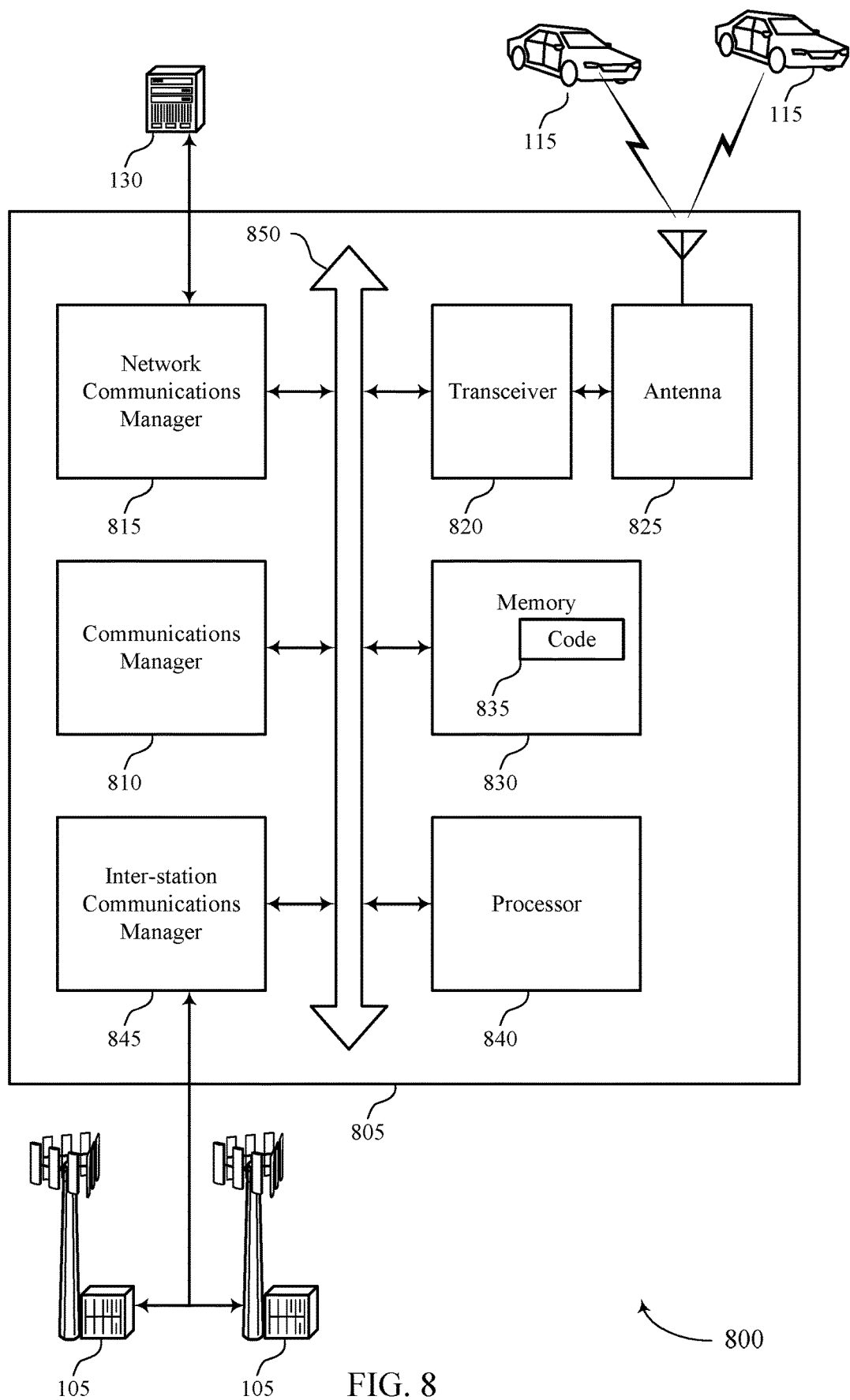
FIG. 8 shows a diagram of a system including a device that supports request and response techniques for wireless systems in accordance with aspects of the present disclosure.

FIG. 8 shows a diagram of a system 800 including a device 805 that supports request and response techniques for wireless systems in accordance with aspects of the present disclosure. The device 805 may be an example of or include the components of device 505, device 605, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may receive, from a first device in a V2X communications system, a first request message to utilize a channel of a shared radio frequency spectrum band, where the first request message includes an indication of a first priority (e.g., an identifier or sequence) and receive, from a second device in the V2X communications system, a second request message to utilize the channel of the shared radio frequency spectrum band, where the second request message includes an indication of a second priority. The communications manager 810 may determine a receive power for each of the first request message and the second request message and determine whether to transmit a response message based on the first priority, the second priority, and the receive power for each of the first request message and the second request message. In some examples, the indication of the first priority may include a first identifier or a first sequence. In some examples, the indication of the second priority may include a second identifier or a second sequence.

The network communications manager 815 may manage communications with the core network (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device to perform various functions (e.g., functions or tasks supporting request and response techniques for wireless systems).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
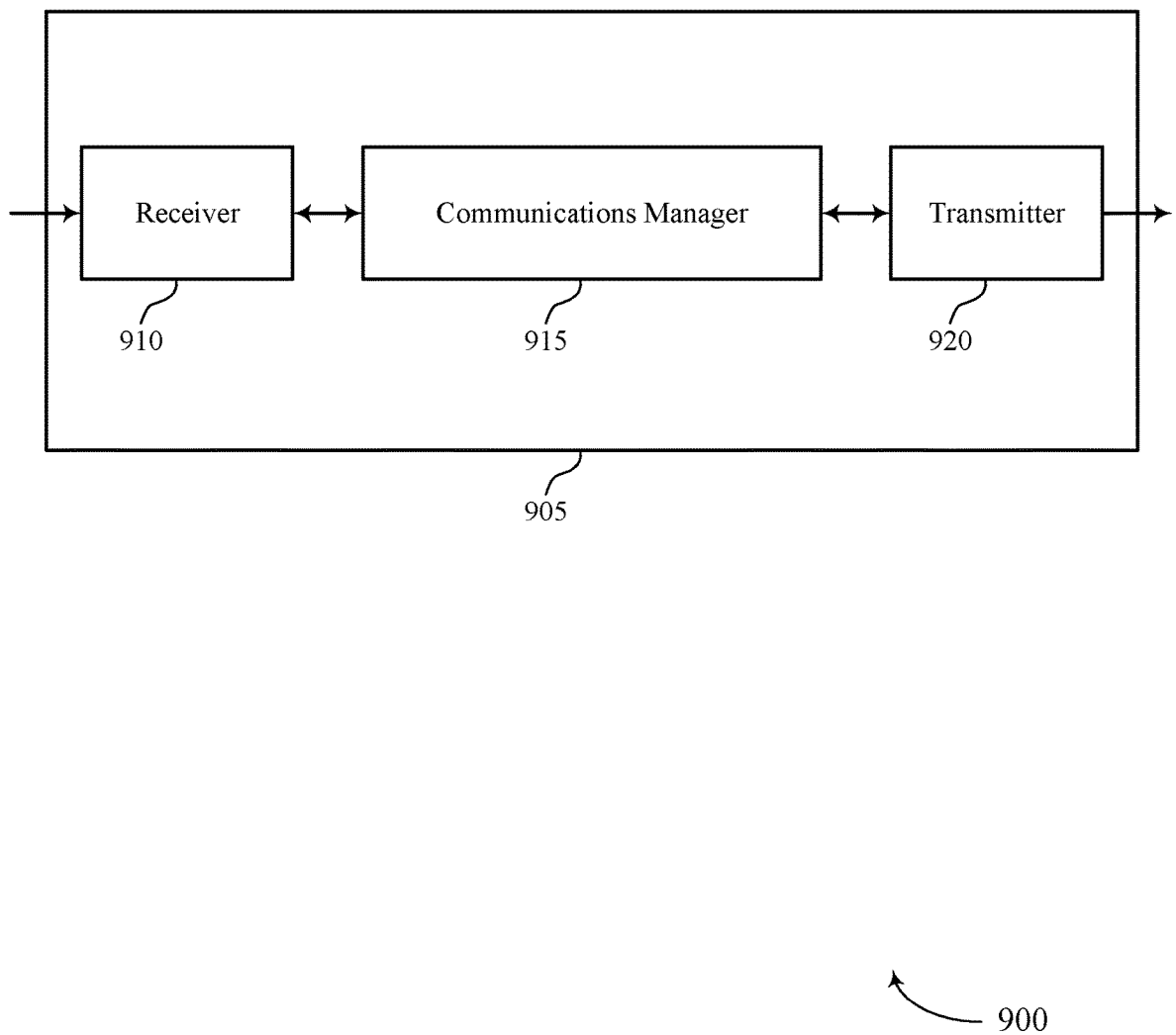
FIGS. 9 and 10 show block diagrams of devices that support request and response techniques for wireless systems in accordance with aspects of the present disclosure.

FIG. 9 shows a block diagram 900 of a device 905 that supports request and response techniques for wireless systems in accordance with aspects of the present disclosure. The device 905 may be an example of aspects of a device such as a vehicle as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to request and response techniques for wireless systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify, by a device associated with a vehicle in a V2X communications system, a set of data for transmission via a shared radio frequency spectrum band and transmit a request message to utilize a channel of the shared radio frequency spectrum band for transmission of the set of data, where the request message includes an indication of a first priority. The communications manager 915 may monitor a set of time-frequency resources of the shared radio frequency spectrum band for a response message from a receiver in the V2X communications system and determine whether to transmit the set of data to one or more wireless devices of the V2X communications system based on the monitoring. In some examples, the indication of the first priority may include a first identifier or a first sequence associated with the first priority. In some examples, the response message may include a second identifier or second sequence associated with a second priority. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
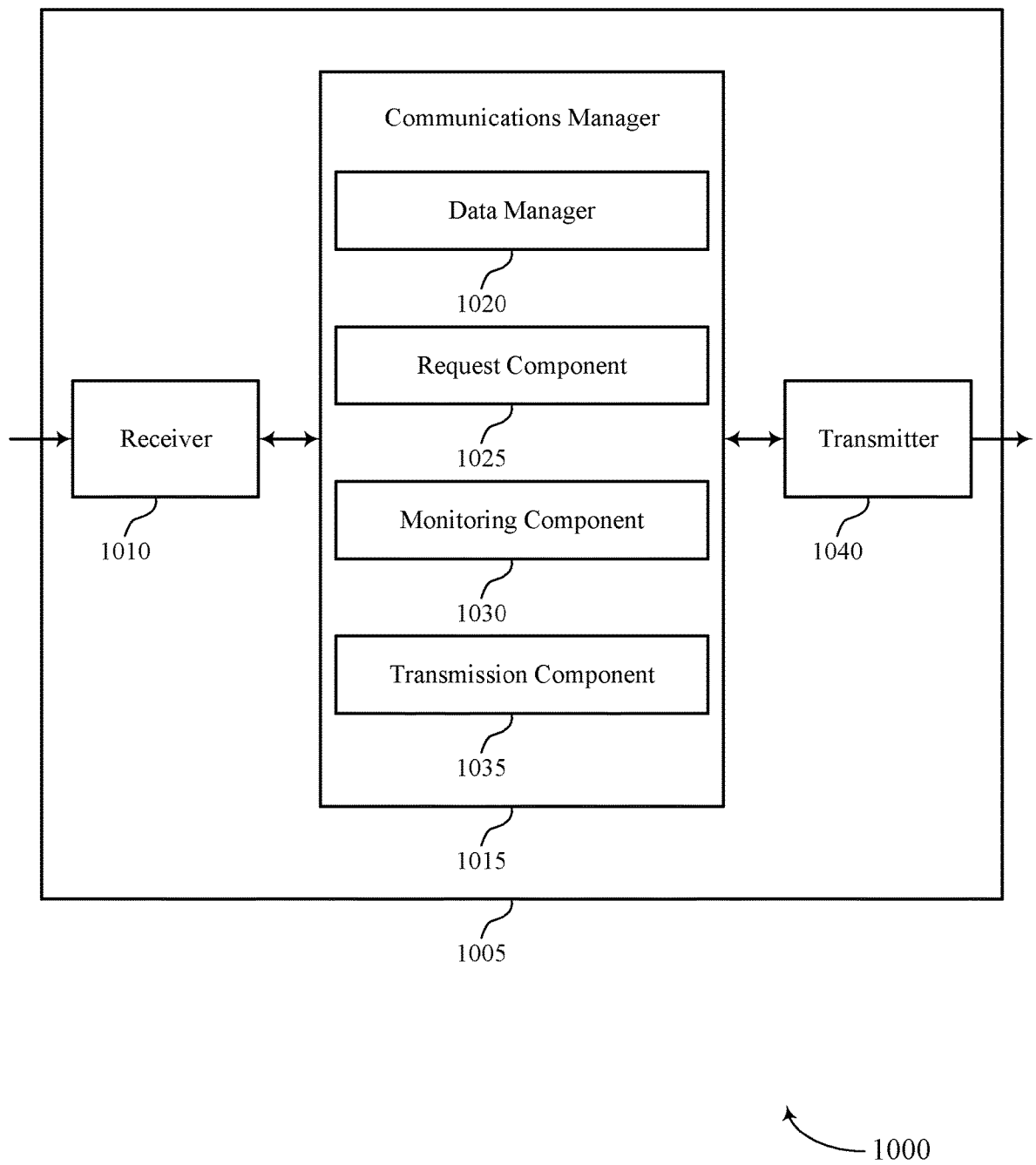

FIG. 10 shows a block diagram 1000 of a device 1005 that supports request and response techniques for wireless systems in accordance with aspects of the present disclosure. The device 1005 may be an example of aspects of a device 905 or a device 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to request and response techniques for wireless systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a data manager 1020, a request component 1025, a monitoring component 1030, and a transmission component 1035. The communications manager 1015 may be an example of aspects of the communications manager 1210 described herein.

The data manager 1020 may identify, by a device associated with a vehicle in a V2X communications system, a set of data for transmission via a shared radio frequency spectrum band.

The request component 1025 may transmit a request message to utilize a channel of the shared radio frequency spectrum band for transmission of the set of data, where the request message includes an indication of a first priority. In some examples, the indication of the first priority may include a first identifier or a first sequence associated with the first priority.

The monitoring component 1030 may monitor a set of time-frequency resources of the shared radio frequency spectrum band for a response message from a receiver in the V2X communications system.

The transmission component 1035 may determine whether to transmit the set of data to one or more wireless devices of the V2X communications system based on the monitoring.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
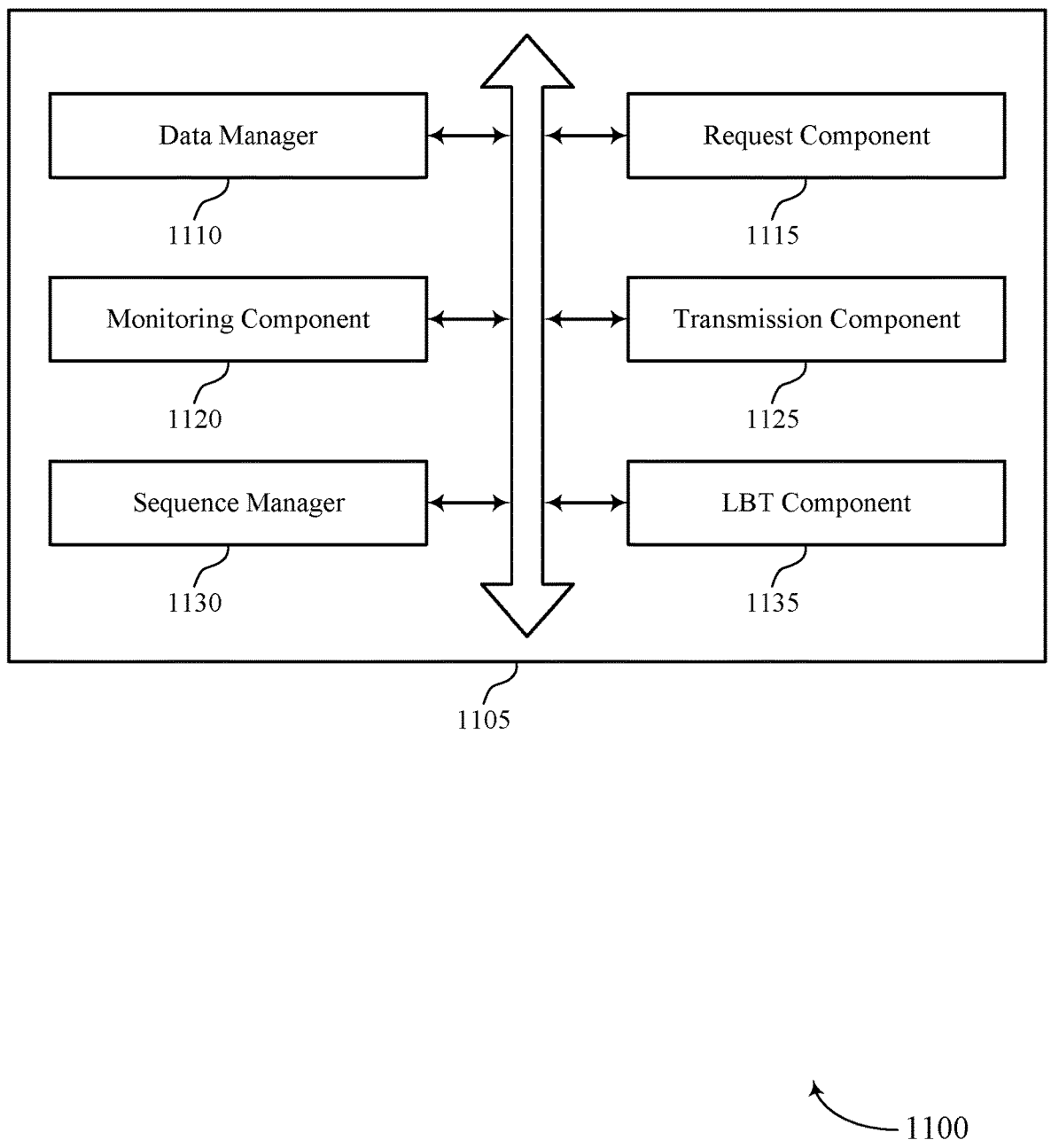
FIG. 11 shows a block diagram of a communications manager that supports request and response techniques for wireless systems in accordance with aspects of the present disclosure.

FIG. 11 shows a block diagram 1100 of a communications manager 1105 that supports request and response techniques for wireless systems in accordance with aspects of the present disclosure. The communications manager 1105 may be an example of aspects of a communications manager 915, a communications manager 1015, or a communications manager 1210 described herein. The communications manager 1105 may include a data manager 1110, a request component 1115, a monitoring component 1120, a transmission component 1125, a sequence manager 1130, and an LBT component 1135. Each of these modules may communicate, directly or indirectly, with one another (e.g., via one or more buses).

The data manager 1110 may identify a set of data for transmission via a shared radio frequency spectrum band.

The request component 1115 may transmit a request message to utilize a channel of the shared radio frequency spectrum band for transmission of the set of data, where the request message includes an indication of a first priority. In some examples, indication of the first priority may include a first identifier or a first sequence associated with the first priority. In some cases, the request message is a multicast transmission transmitted to a set of receivers in the V2X communications system.

The monitoring component 1120 may monitor a set of time-frequency resources of the shared radio frequency spectrum band for a response message from a receiver in the V2X communications system. In some examples, the monitoring component 1120 may determine whether the response message from the receiver has been successfully received. In some examples, the monitoring component 1120 receives the response message from the receiver. In some examples, the response message includes an indication of a second priority that is higher than the first priority. In some examples, the response message includes an indication of a second priority that is less than or equal to the first priority. In some examples, the indication of the second priority includes a second identifier or a second sequence associated with the second priority. In some examples, the monitoring component 1120 may receive the response message in a second symbol of the TTI.

The transmission component 1125 may determine whether to transmit the set of data to one or more wireless devices of the V2X communications system based on the monitoring. In some examples, the transmission component 1125 may refrain from transmitting the set of data based on the second priority being higher than the first priority. In some examples, the transmission component 1125 may transmit the set of data based on the second priority being less than or equal to the first priority. In some examples, the transmission component 1125 may transmit the set of data based on a comparison of a first identifier associated with the first priority and a second identifier associated with the second priority. In some examples, the transmission component 1125 may transmit the set of data based on determining that the response message has not been received.

In some examples, the transmission component 1125 may transmit the request message including a request identifier, which may be an identifier or sequence. In some examples, the transmission component 1125 may transmit the request message in a first symbol of a TTI. In some examples, the transmission component 1125 may transmit at least a portion of the set of data in a third symbol of the TTI following the first and second symbols. In some cases, the first symbol is an initial symbol of the TTI. In some cases, the first symbol and second symbol are separated by a gap.

The sequence manager 1130 may select a request identifier associated with the first priority. In some cases, the request identifier may be an identifier. In some cases, sequence manager 1130 may select the identifier from one or more identifiers associated with the first priority. In some cases, the request identifier may be a sequence, and the sequence manager 1130 may select the sequence from a set of ordered sequences, where the sequence is associated with the first priority. In some cases, the request sequence is randomly selected from the set of ordered request sequences.

The LBT component 1135 may perform an LBT procedure on the channel of the shared radio frequency spectrum band, where determining whether to transmit the set of data is based on the LBT procedure.

Figure 12:
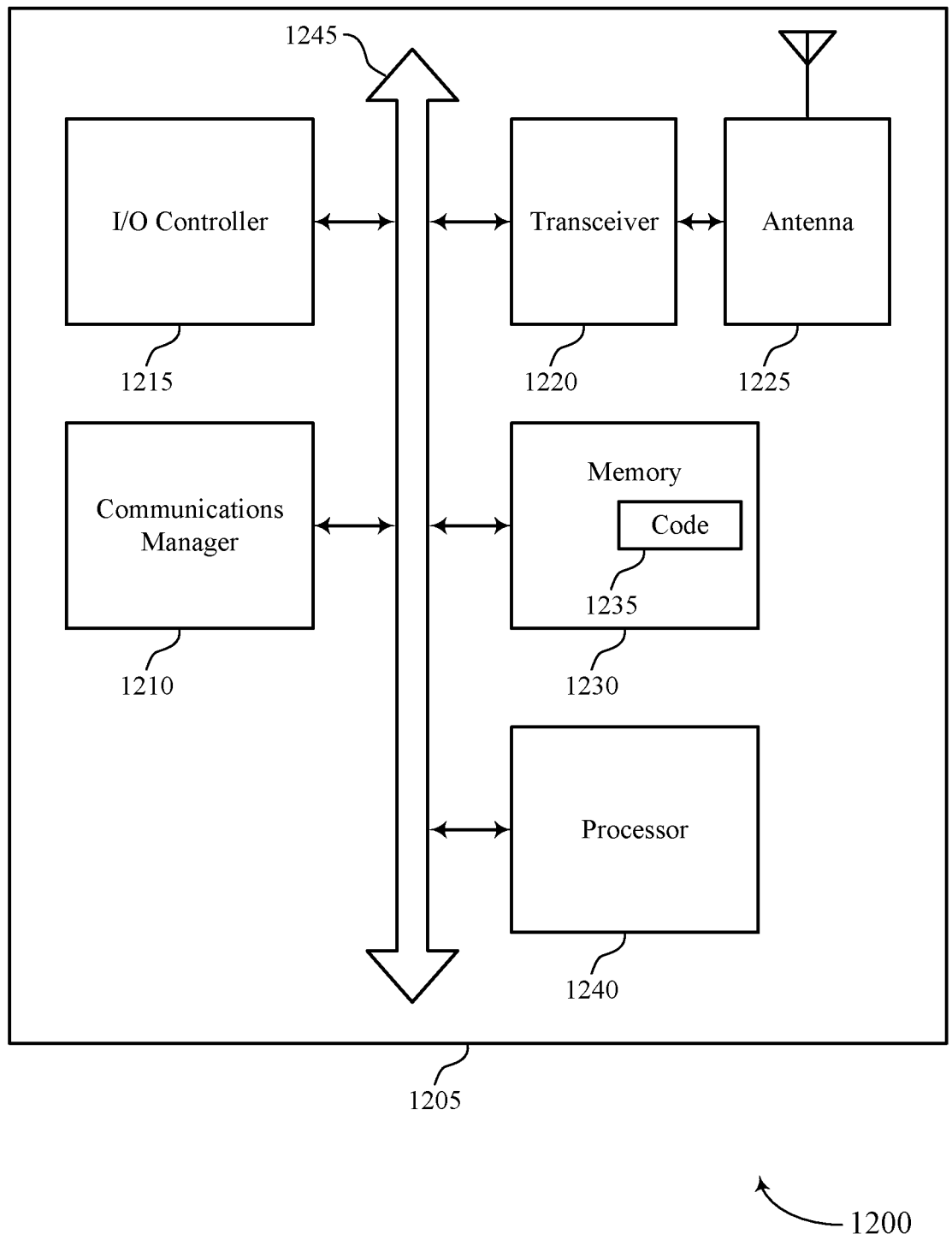
FIG. 12 shows a diagram of a system including a device that supports request and response techniques for wireless systems in accordance with aspects of the present disclosure.

FIG. 12 shows a diagram of a system 1200 including a device 1205 that supports request and response techniques for wireless systems in accordance with aspects of the present disclosure. The device 1205 may be an example of or include the components of device 905, device 1005, or a device as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify a set of data for transmission via a shared radio frequency spectrum band and transmit a request message to utilize a channel of the shared radio frequency spectrum band for transmission of the set of data, where the request message includes an indication of a first priority. The communications manager 1210 may monitor a set of time-frequency resources of the shared radio frequency spectrum band for a response message from a receiver in the V2X communications system and determine whether to transmit the set of data to one or more wireless devices of the V2X communications system based on the monitoring.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting request and response techniques for wireless systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
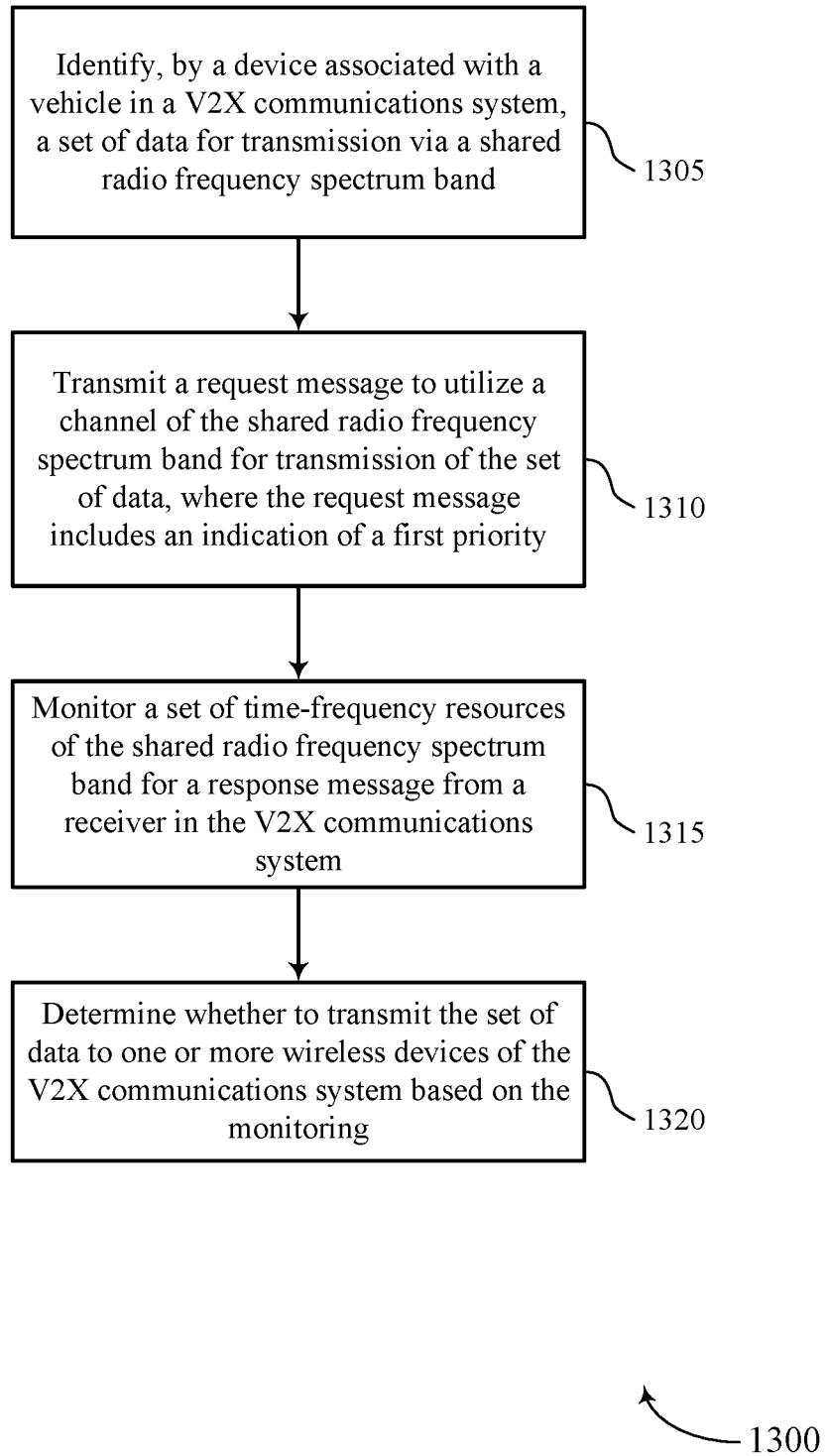
FIGS. 13 through 18 show flowcharts illustrating methods that support request and response techniques for wireless systems in accordance with aspects of the present disclosure.

FIG. 13 shows a flowchart illustrating a method 1300 that supports request and response techniques for wireless systems in accordance with aspects of the present disclosure. The operations of method 1300 may be implemented by a device (e.g., a vehicle) or its components as described herein. For example, the operations of method 1300 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1305, the device may identify a set of data for transmission via a shared radio frequency spectrum band. The operations of 1305 may be performed according to the methods described herein. In some examples, aspects of the operations of 1305 may be performed by a data manager as described with reference to FIGS. 9 through 12.

At 1310, the device may transmit a request message to utilize a channel of the shared radio frequency spectrum band for transmission of the set of data, where the request message includes an indication of a first priority. In some cases, the indication of the first priority may include a first identifier or first sequence associated with the first priority. The operations of 1310 may be performed according to the methods described herein. In some examples, aspects of the operations of 1310 may be performed by a request component as described with reference to FIGS. 9 through 12.

At 1315, the device may monitor a set of time-frequency resources of the shared radio frequency spectrum band for a response message from a receiver in the V2X communications system. The operations of 1315 may be performed according to the methods described herein. In some examples, aspects of the operations of 1315 may be performed by a monitoring component as described with reference to FIGS. 9 through 12.

At 1320, the device may determine whether to transmit the set of data to one or more wireless devices of the V2X communications system based on the monitoring. The operations of 1320 may be performed according to the methods described herein. In some examples, aspects of the operations of 1320 may be performed by a transmission component as described with reference to FIGS. 9 through 12.

Figure 14:
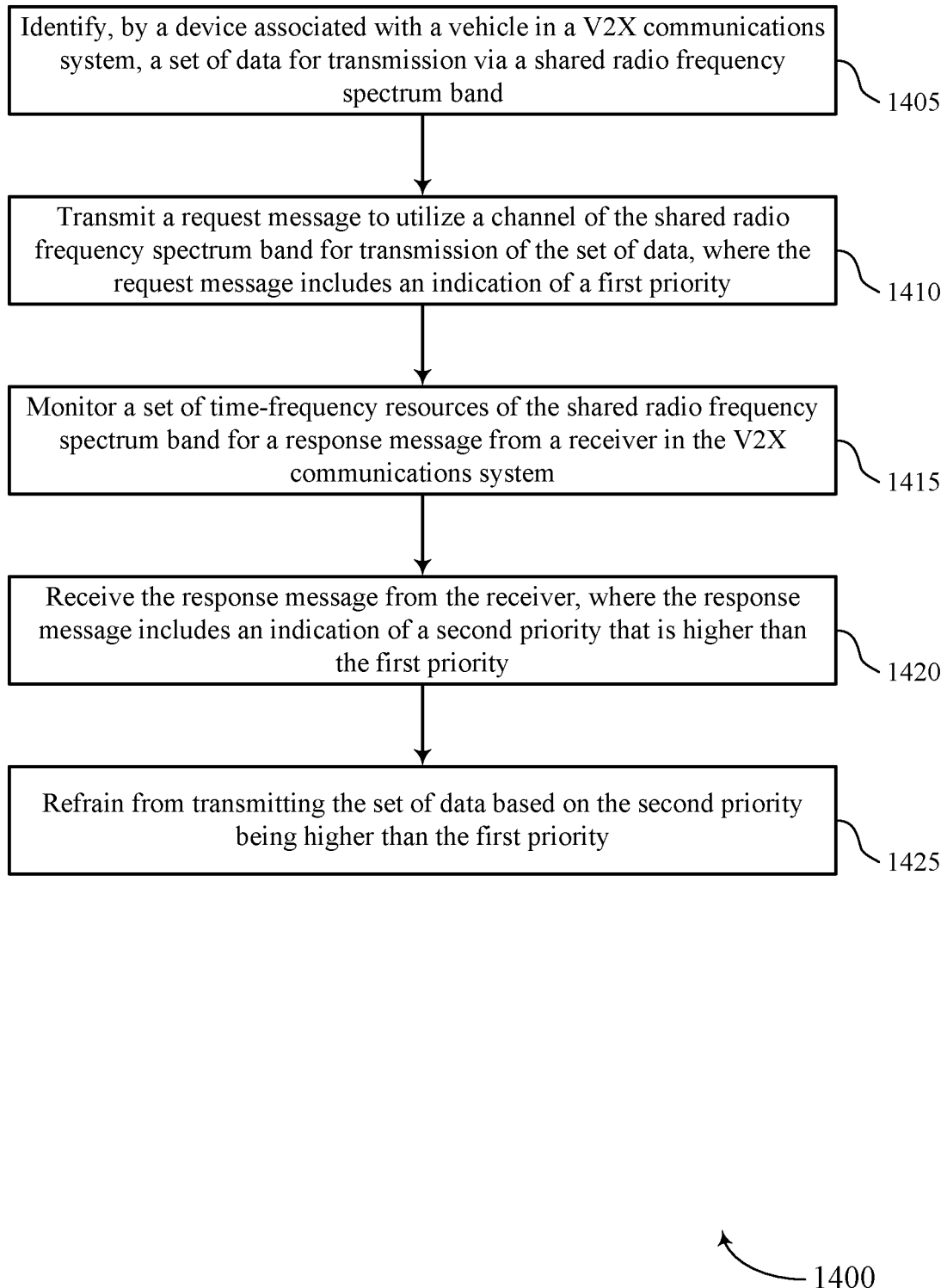

FIG. 14 shows a flowchart illustrating a method 1400 that supports request and response techniques for wireless systems in accordance with aspects of the present disclosure. The operations of method 1400 may be implemented by a device (e.g., a vehicle) or its components as described herein. For example, the operations of method 1400 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1405, the device may identify a set of data for transmission via a shared radio frequency spectrum band. The operations of 1405 may be performed according to the methods described herein. In some examples, aspects of the operations of 1405 may be performed by a data manager as described with reference to FIGS. 9 through 12.

At 1410, the device may transmit a request message to utilize a channel of the shared radio frequency spectrum band for transmission of the set of data, where the request message includes an indication of a first priority. In some cases, the indication of the first priority may include a first identifier or first sequence associated with the first priority. The operations of 1410 may be performed according to the methods described herein. In some examples, aspects of the operations of 1410 may be performed by a request component as described with reference to FIGS. 9 through 12.

At 1415, the device may monitor a set of time-frequency resources of the shared radio frequency spectrum band for a response message from a receiver in the V2X communications system. The operations of 1415 may be performed according to the methods described herein. In some examples, aspects of the operations of 1415 may be performed by a monitoring component as described with reference to FIGS. 9 through 12.

At 1420, the device may receive the response message from the receiver, where the response message includes an indication of a second priority that is higher than the first priority. In some cases, the indication of the second priority may include a second identifier or second sequence associated with the second priority. The operations of 1420 may be performed according to the methods described herein. In some examples, aspects of the operations of 1420 may be performed by a monitoring component as described with reference to FIGS. 9 through 12.

At 1425, the device may refrain from transmitting the set of data based on the second priority being higher than the first priority. The operations of 1425 may be performed according to the methods described herein. In some examples, aspects of the operations of 1425 may be performed by a transmission component as described with reference to FIGS. 9 through 12.

Figure 15:
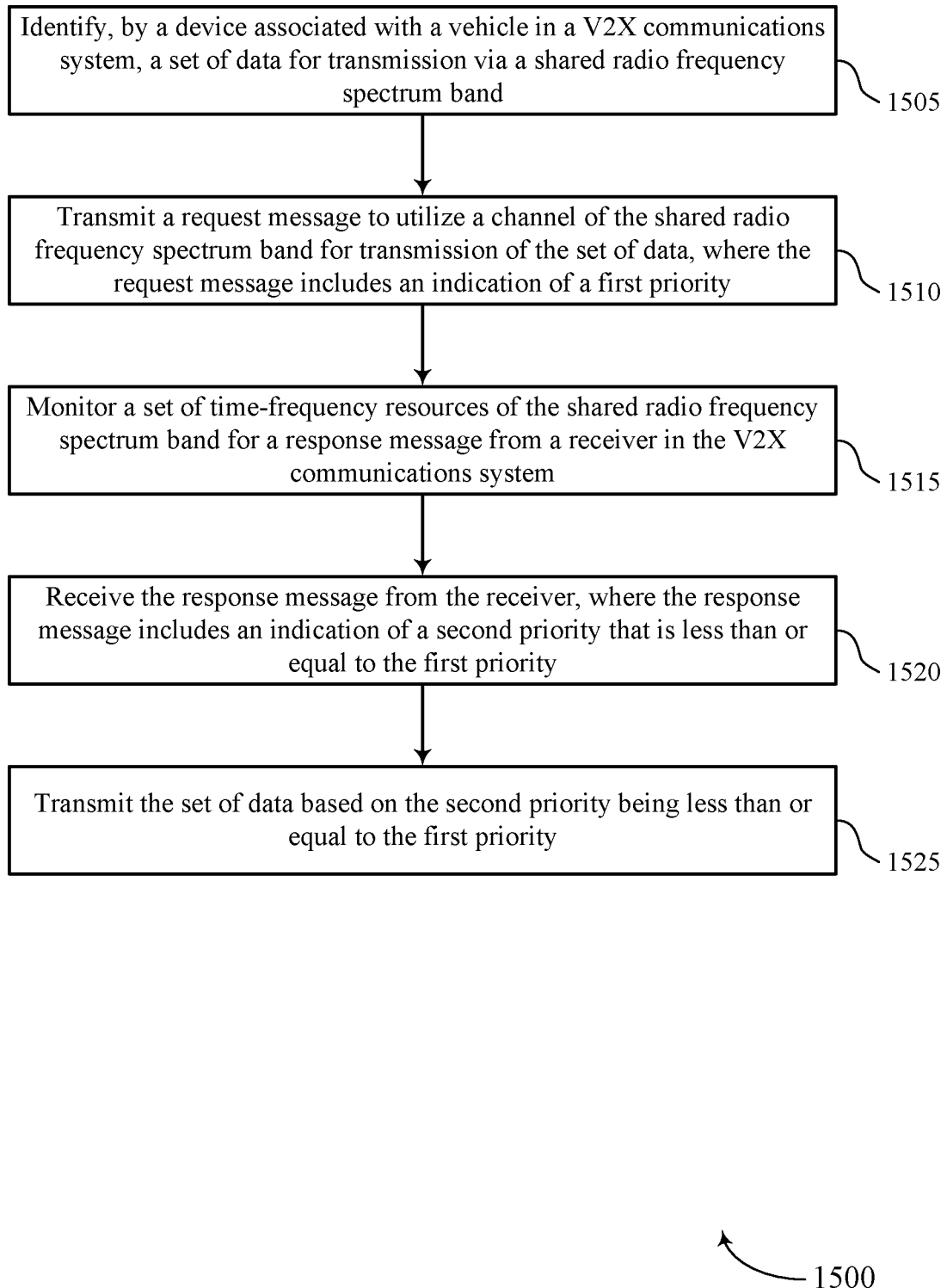

FIG. 15 shows a flowchart illustrating a method 1500 that supports request and response techniques for wireless systems in accordance with aspects of the present disclosure. The operations of method 1500 may be implemented by a device (e.g., a vehicle) or its components as described herein. For example, the operations of method 1500 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1505, the device may identify a set of data for transmission via a shared radio frequency spectrum band. The operations of 1505 may be performed according to the methods described herein. In some examples, aspects of the operations of 1505 may be performed by a data manager as described with reference to FIGS. 9 through 12.

At 1510, the device may transmit a request message to utilize a channel of the shared radio frequency spectrum band for transmission of the set of data, where the request message includes an indication of a first priority. In some cases, the indication of the first priority may include a first identifier or first sequence associated with the first priority. The operations of 1510 may be performed according to the methods described herein. In some examples, aspects of the operations of 1510 may be performed by a request component as described with reference to FIGS. 9 through 12.

At 1515, the device may monitor a set of time-frequency resources of the shared radio frequency spectrum band for a response message from a receiver in the V2X communications system. The operations of 1515 may be performed according to the methods described herein. In some examples, aspects of the operations of 1515 may be performed by a monitoring component as described with reference to FIGS. 9 through 12.

At 1520, the device may receive the response message from the receiver, where the response message includes an indication of a second priority that is less than or equal to the first priority. In some cases, the indication of the second priority may include a second identifier or second sequence associated with the second priority. The operations of 1520 may be performed according to the methods described herein. In some examples, aspects of the operations of 1520 may be performed by a monitoring component as described with reference to FIGS. 9 through 12.

At 1525, the device may transmit the set of data based on the second priority being less than or equal to the first priority. For example, the device may compare the first priority with the second priority, or the first identifier with the second identifier, or the first sequence with the second sequence and transmit the set of data based on the comparison. The operations of 1525 may be performed according to the methods described herein. In some examples, aspects of the operations of 1525 may be performed by a transmission component as described with reference to FIGS. 9 through 12.

Figure 16:
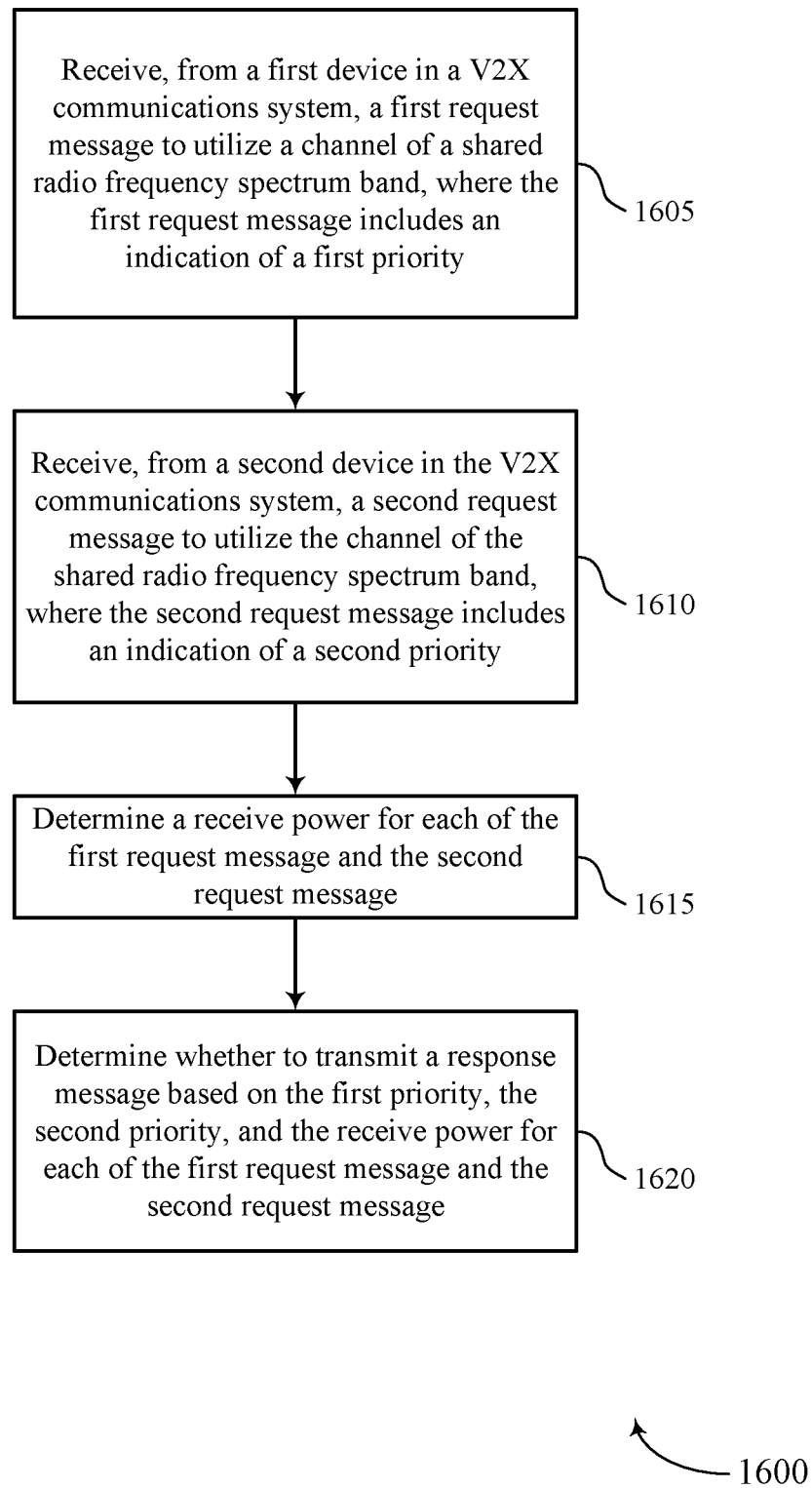

FIG. 16 shows a flowchart illustrating a method 1600 that supports request and response techniques for wireless systems in accordance with aspects of the present disclosure. The operations of method 1600 may be implemented by a receiving device (e.g., a vehicle) or its components as described herein. For example, the operations of method 1600 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1605, the receiving device may receive, from a first device in a V2X communications system, a first request message to utilize a channel of a shared radio frequency spectrum band, where the first request message includes an indication of a first priority. In some cases, the indication of the first priority may include a first identifier or first sequence associated with the first priority. The operations of 1605 may be performed according to the methods described herein. In some examples, aspects of the operations of 1605 may be performed by a request message receiving device as described with reference to FIGS. 5 through 8.

At 1610, the receiving device may receive, from a second device in the V2X communications system, a second request message to utilize the channel of the shared radio frequency spectrum band, where the second request message includes an indication of a second priority. In some cases, the indication of the second priority may include a second identifier or second sequence associated with the second priority. The operations of 1610 may be performed according to the methods described herein. In some examples, aspects of the operations of 1610 may be performed by a request message receiving device as described with reference to FIGS. 5 through 8.

At 1615, the receiving device may determine a receive power for each of the first request message and the second request message. The operations of 1615 may be performed according to the methods described herein. In some examples, aspects of the operations of 1615 may be performed by a power manager as described with reference to FIGS. 5 through 8.

At 1620, the receiving device may determine whether to transmit a response message based on the first priority, the second priority, and the receive power for each of the first request message and the second request message. In some examples, the receiving device may determine whether to transmit a response message based on a comparison of the first identifier and the second identifier. The operations of 1620 may be performed according to the methods described herein. In some examples, aspects of the operations of 1620 may be performed by a response component as described with reference to FIGS. 5 through 8.

Figure 17:
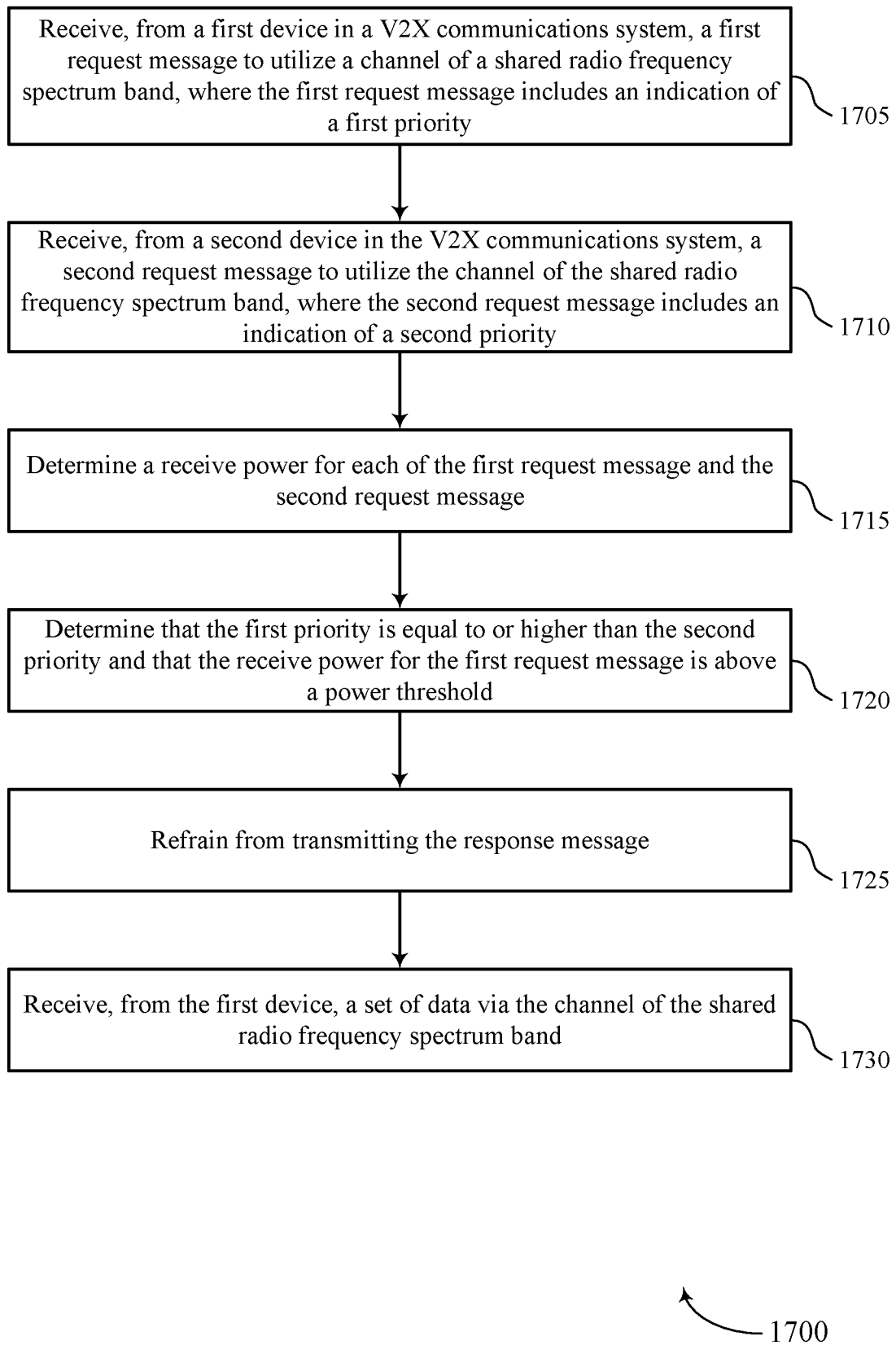

FIG. 17 shows a flowchart illustrating a method 1700 that supports request and response techniques for wireless systems in accordance with aspects of the present disclosure. The operations of method 1700 may be implemented by a receiving device (e.g., a vehicle) or its components as described herein. For example, the operations of method 1700 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1705, the receiving device may receive, from a first device in a V2X communications system, a first request message to utilize a channel of a shared radio frequency spectrum band, where the first request message includes an indication of a first priority. In some cases, the indication of the first priority may include a first identifier or first sequence associated with the first priority. The operations of 1705 may be performed according to the methods described herein. In some examples, aspects of the operations of 1705 may be performed by a request message receiving device as described with reference to FIGS. 5 through 8.

At 1710, the receiving device may receive, from a second device in the V2X communications system, a second request message to utilize the channel of the shared radio frequency spectrum band, where the second request message includes an indication of a second priority. In some cases, the indication of the second priority may include a second identifier or second sequence associated with the second priority. The operations of 1710 may be performed according to the methods described herein. In some examples, aspects of the operations of 1710 may be performed by a request message receiving device as described with reference to FIGS. 5 through 8.

At 1715, the receiving device may determine a receive power for each of the first request message and the second request message. The operations of 1715 may be performed according to the methods described herein. In some examples, aspects of the operations of 1715 may be performed by a power manager as described with reference to FIGS. 5 through 8.

At 1720, the receiving device may determine that the first priority is equal to or higher than the second priority and that the receive power for the first request message is above a power threshold. The operations of 1720 may be performed according to the methods described herein. In some examples, aspects of the operations of 1720 may be performed by a determination component as described with reference to FIGS. 5 through 8.

At 1725, the receiving device may refrain from transmitting the response message. The operations of 1725 may be performed according to the methods described herein. In some examples, aspects of the operations of 1725 may be performed by a response component as described with reference to FIGS. 5 through 8.

At 1730, the receiving device may receive, from the first device, a set of data via the channel of the shared radio frequency spectrum band. The operations of 1730 may be performed according to the methods described herein. In some examples, aspects of the operations of 1730 may be performed by a reception component as described with reference to FIGS. 5 through 8.

Figure 18:
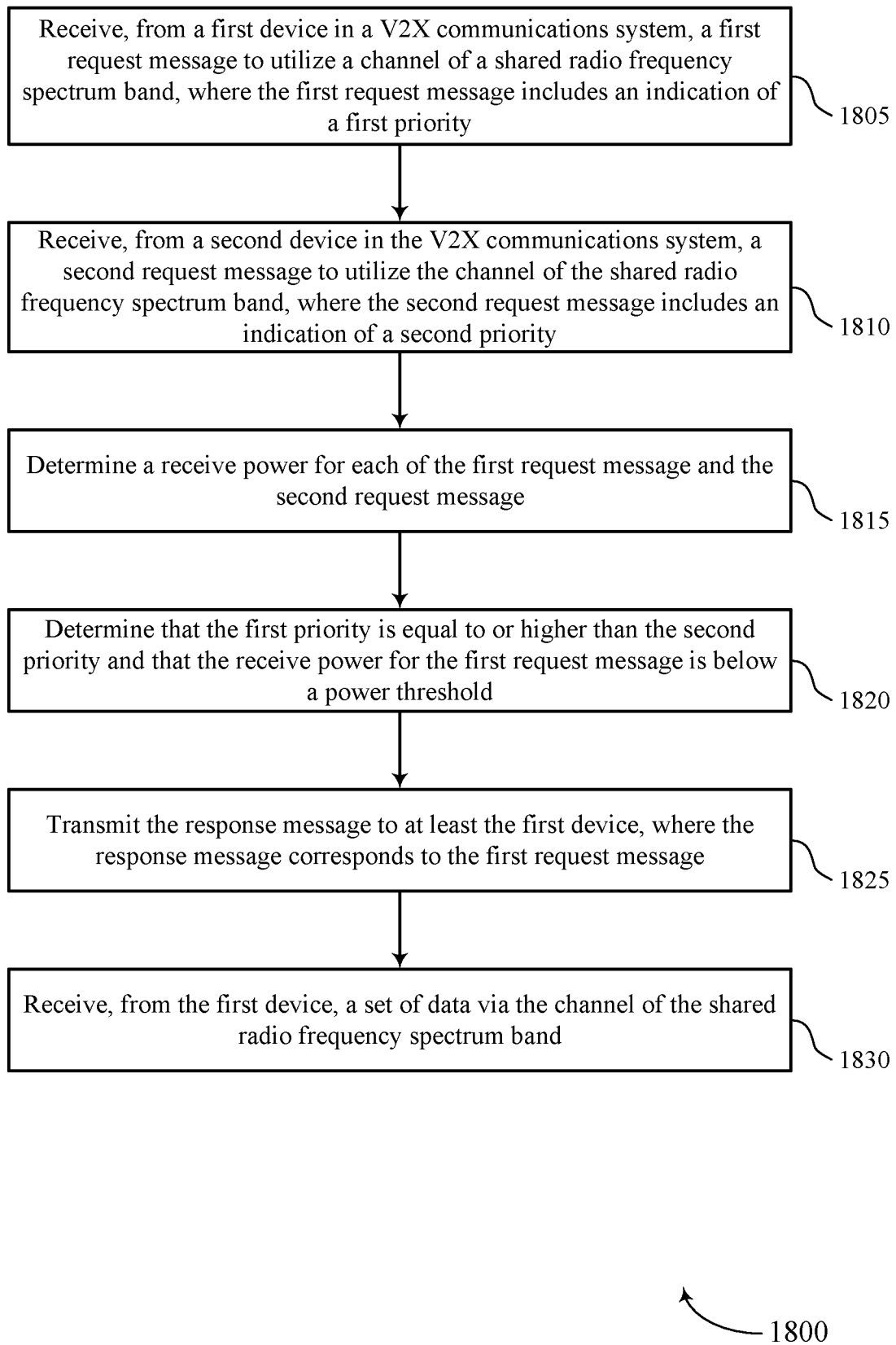

FIG. 18 shows a flowchart illustrating a method 1800 that supports request and response techniques for wireless systems in accordance with aspects of the present disclosure. The operations of method 1800 may be implemented by a receiving device (e.g., a vehicle) or its components as described herein. For example, the operations of method 1800 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1805, the receiving device may receive, from a first device in a V2X communications system, a first request message to utilize a channel of a shared radio frequency spectrum band, where the first request message includes an indication of a first priority. In some cases, the indication of the first priority may include a first identifier or first sequence associated with the first priority. The operations of 1805 may be performed according to the methods described herein. In some examples, aspects of the operations of 1805 may be performed by a request message receiving device as described with reference to FIGS. 5 through 8.

At 1810, the receiving device may receive, from a second device in the V2X communications system, a second request message to utilize the channel of the shared radio frequency spectrum band, where the second request message includes an indication of a second priority. In some cases, the indication of the second priority may include a second identifier or second sequence associated with the second priority. The operations of 1810 may be performed according to the methods described herein. In some examples, aspects of the operations of 1810 may be performed by a request message receiving device as described with reference to FIGS. 5 through 8.

At 1815, the receiving device may determine a receive power for each of the first request message and the second request message. The operations of 1815 may be performed according to the methods described herein. In some examples, aspects of the operations of 1815 may be performed by a power manager as described with reference to FIGS. 5 through 8.

At 1820, the receiving device may determine that the first priority is equal to or higher than the second priority and that the receive power for the first request message is below a power threshold. The operations of 1820 may be performed according to the methods described herein. In some examples, aspects of the operations of 1820 may be performed by a determination component as described with reference to FIGS. 5 through 8.

At 1825, the receiving device may transmit the response message to at least the first device, where the response message corresponds to the first request message. The operations of 1825 may be performed according to the methods described herein. In some examples, aspects of the operations of 1825 may be performed by a response component as described with reference to FIGS. 5 through 8.

At 1830, the receiving device may receive, from the first device, a set of data via the channel of the shared radio frequency spectrum band. The operations of 1830 may be performed according to the methods described herein. In some examples, aspects of the operations of 1830 may be performed by a reception component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Embodiment 1: A method for wireless communications, comprising: identifying, by a device associated with a vehicle in a V2X communications system, a set of data for transmission via a shared radio frequency spectrum band; transmitting a request message to utilize a channel of the shared radio frequency spectrum band for transmission of the set of data, wherein the request message comprises an indication of a first priority; monitoring a set of time-frequency resources of the shared radio frequency spectrum band for a response message from a receiver in the V2X communications system; and determining whether to transmit the set of data to one or more wireless devices of the V2X communications system based at least in part on the monitoring.

Embodiment 2: The method of embodiment 1, wherein monitoring the set of time-frequency resources comprises: receiving the response message from the receiver, wherein the response message comprises an indication of a second priority that is higher than the first priority; and refraining from transmitting the set of data based at least in part on the second priority being higher than the first priority.

Embodiment 3: The method of any of embodiments 1 or 2, wherein monitoring the set of time-frequency resources comprises: receiving the response message from the receiver, wherein the response message comprises an indication of a second priority that is less than or equal to the first priority; and transmitting the set of data based at least in part on the second priority being less than or equal to the first priority.

Embodiment 4: The method of any of embodiments 1 through 3, wherein monitoring the set of time-frequency resources comprises: determining whether the response message from the receiver has been successfully received; and transmitting the set of data based at least in part on determining that the response message has not been received.

Embodiment 5: The method of any of embodiments 1 through 4, further comprising: selecting a request identifier associated with the first priority; and transmitting the request message comprising the request identifier.

Embodiment 6: The method of embodiment 5, wherein the request identifier is a sequence that is randomly selected from a set of ordered sequences.

Embodiment 7: The method of any of embodiments 1 through 6, selecting a request identifier associated with the first priority, wherein the request message comprises a first modulated signal associated with the first priority and with the request identifier.

Embodiment 8: The method of any of embodiments 1 through 7, wherein the response message comprises a response identifier associated with a second priority or a second modulated signal associated with the second priority and with the response identifier.

Embodiment 9: The method of any of embodiments 1 through 8, wherein transmitting the request message comprises transmitting the request message in a first symbol of a TTI.

Embodiment 10: The method of embodiment 9, wherein monitoring the set of time-frequency resources comprises receiving the response message in a second symbol of the TTI.

Embodiment 11: The method of embodiment 10, further comprising: transmitting at least a portion of the set of data in a third symbol of the TTI following the first and second symbols.

Embodiment 12: The method of embodiment 9, wherein the first symbol is an initial symbol of the TTI.

Embodiment 13: The method of embodiment 9, wherein the first symbol and second symbol are separated by a gap.

Embodiment 14: The method of any of embodiments 1 through 13, further comprising: performing an LBT procedure on the channel of the shared radio frequency spectrum band, wherein determining whether to transmit the set of data is based at least in part on the LBT procedure.

Embodiment 15: The method of any of embodiments 1 through 14, wherein the request message is a multicast transmission transmitted to a plurality of receivers in the V2X communications system.

Embodiment 16: A method for wireless communications, comprising: receiving, from a first device in a vehicle-to-everything (V2X) communications system, a first request message to utilize a channel of a shared radio frequency spectrum band, wherein the first request message comprises an indication of a first priority; receiving, from a second device in the V2X communications system, a second request message to utilize the channel of the shared radio frequency spectrum band, wherein the second request message comprises an indication of a second priority; determining a receive power for each of the first request message and the second request message; and determining whether to transmit a response message based at least in part on the first priority, the second priority, and the receive power for each of the first request message and the second request message.

Embodiment 17: The method of embodiment 16, further comprising: determining that the first priority is equal to or higher than the second priority and that the receive power for the first request message is above a power threshold; and refraining from transmitting the response message.

Embodiment 18: The method of embodiment 17, further comprising receiving, from the first device, a set of data via the channel of the shared radio frequency spectrum band.

Embodiment 19: The method of any of embodiments 16 through 18, further comprising: determining that the first priority is equal to or higher than the second priority and that the receive power for the first request message is below a power threshold; and transmitting the response message to at least the first device, wherein the response message corresponds to the first request message.

Embodiment 20: The method of embodiment 19, further comprising: receiving, from the first device, a set of data via the channel of the shared radio frequency spectrum band.

Embodiment 21: The method of any of embodiments 16 through 20, further comprising: determining that the first priority is less than the second priority and that the receive power for the second request message is below a power threshold; and transmitting the response message to at least the second device, wherein the response message corresponds to the second request message.

Embodiment 22: The method of embodiment 21, further comprising: receiving, from the second device, a set of data via the channel of the shared radio frequency spectrum band.

Embodiment 23: The method of any of embodiments 16 through 22, further comprising: determining that the receive power for the first request message and the receive power for the second request message is above a power threshold; and refraining from transmitting the response message.

Embodiment 24: The method of any of embodiments 16 through 23, further comprising: receiving the first request message in a first symbol of a TTI; and transmitting the response message in a second symbol of the TTI.

Embodiment 25: The method of embodiment 24, wherein the first and second symbols are separated by a gap.

Embodiment 26: The method of any of embodiments 24 and 25, wherein the first symbol is an initial symbol in the TTI.

Embodiment 27: The method of any of embodiments 16 through 26, wherein the first request message comprises a first request identifier associated with the first priority or a first modulated signal associated with the first priority, and the second request message comprises a second request identifier associated with the second priority or a second modulated signal associated with the second priority.

Embodiment 28: The method of any of embodiments 16 through 27, wherein the response message comprises a sequence associated with the first priority or with the second priority, or a modulated signal associated with the first priority or with the second priority.

Embodiment 29: An apparatus comprising at least one means for performing a method of any embodiments 1 through 15.

Embodiment 30: An apparatus for wireless communications comprising a processor; memory in electronic communication with the processor; and instructions stored in the memory and executable by the processor to cause the apparatus to perform a method of any embodiments 1 through 15.

Embodiment 31: A non-transitory computer-readable medium storing code for wireless communications, the code comprising instructions executable by a processor to perform a method of any embodiments 1 through 15.

Embodiment 32: An apparatus comprising at least one means for performing a method of any embodiments 16 through 28.

Embodiment 33: An apparatus for wireless communications comprising a processor; memory in electronic communication with the processor; and instructions stored in the memory and executable by the processor to cause the apparatus to perform a method of any embodiments 16 through 28.

Embodiment 34: A non-transitory computer-readable medium storing code for wireless communications, the code comprising instructions executable by a processor to perform a method of any embodiments 16 through 28.

What is claimed is:

1. A method for wireless communications at a vehicle user equipment (UE) in a vehicle-to-everything (V2X) communications system, comprising:
    transmitting, by the vehicle UE, a request message to utilize a channel of a shared radio frequency spectrum band for transmission, via the channel, of a set of data to a second vehicle UE in the V2X communications system, wherein the request message comprises a request identifier that indicates a first priority associated with the request message, the request identifier selected from multiple identifiers;
    receiving, in response to the request message and via the shared radio frequency spectrum band, a response message comprising an indication of a second priority; and
    determining whether to transmit the set of data to the second vehicle UE based at least in part on receiving the response message and a comparison between the first priority and the second priority, wherein determining whether to transmit comprises transmitting the set of data via the channel to one or more wireless devices including the second vehicle UE in the V2X wireless communications system based at least in part on the second priority being less than or equal to the first priority or refraining from transmitting the set of data via the channel based at least in part on the second priority being greater than the first priority.

2. The method of claim 1, further comprising:
    selecting the request identifier associated with the first priority; and
    transmitting the request message comprising the request identifier.

3. The method of claim 2, wherein the request identifier comprises a sequence that is randomly selected from a set of ordered sequences.

4. The method of claim 1, further comprising:
    selecting the request identifier that indicates the first priority, wherein the request message comprises a first modulated signal associated with the first priority and with the request identifier.

5. The method of claim 4, wherein the response message comprises a response identifier associated with the second priority or a second modulated signal associated with the second priority and with the response identifier.

6. The method of claim 1, wherein transmitting the request message comprises:
    transmitting the request message in a first symbol of a transmission time interval (TTI).

7. The method of claim 6, wherein receiving the response message comprises:
    receiving the response message in a second symbol of the TTI.

8. The method of claim 7, further comprising:
    transmitting at least a portion of the set of data in a third symbol of the TTI following the first symbol and the second symbol.

9. The method of claim 6, wherein the first symbol is an initial symbol of the TTI.

10. The method of claim 6, wherein the first symbol and second symbol are separated by a gap.

11. The method of claim 1, further comprising:
performing a listen-before-talk (LBT) procedure on the channel of the shared radio frequency spectrum band, wherein determining whether to transmit the set of data is based at least in part on the LBT procedure.

12. The method of claim 1, wherein the request message is a multicast transmission transmitted to a plurality of receivers in the V2X communications system.

13. An apparatus for wireless communications at a vehicle user equipment (UE) in a vehicle-to-everything (V2X) communications system, comprising:
a processor,
memory coupled with the processor; and
instructions stored in the memory and executable by the processor to cause the apparatus to:
transmit, by the vehicle UE, a request message to utilize a channel of a shared radio frequency spectrum band for transmission, via the channel, of a set of data to a second vehicle UE in the V2X communications system, wherein the request message comprises a request identifier that indicates a first priority associated with the request message, the request identifier selected from multiple identifiers;
receive, in response to the request message and via the shared radio frequency spectrum band, a response message comprising an indication of a second priority; and
determine whether to transmit the set of data to the second vehicle UE based at least in part on receiving the response message and a comparison between the first priority and the second priority, wherein determining whether to transmit comprises transmitting the set of data via the channel to one or more wireless devices including the second vehicle UE in the V2X wireless communications system based at least in part on the second priority being less than or equal to the first priority or refraining from transmitting the set of data based at least in part on the second priority being greater than the first priority.

* * * * *